United States Patent
Brown

(10) Patent No.: US 6,367,834 B1
(45) Date of Patent: Apr. 9, 2002

(54) DEVICE FOR RECEIVING AND SECURING A BALL

(76) Inventor: David Richard Brown, 1714 Southgate, Brownwood, TX (US) 76801

(*) Notice: Subject to any disclaimer, the term of this patent is extended or adjusted under 35 U.S.C. 154(b) by 0 days.

(21) Appl. No.: 09/593,454

(22) Filed: Jun. 14, 2000

Related U.S. Application Data

(63) Continuation-in-part of application No. 09/271,015, filed on Mar. 17, 1999.
(60) Provisional application No. 60/078,993, filed on Mar. 23, 1998, and provisional application No. 60/116,060, filed on Jan. 15, 1999.

(51) Int. Cl.[7] .................................................. B60D 1/06
(52) U.S. Cl. ..................................................... 280/512
(58) Field of Search ................................ 280/504, 511, 280/512

(56) References Cited

U.S. PATENT DOCUMENTS

| | | | |
|---|---|---|---|
| 1,953,365 A | | 4/1934 | Reetz |
| 2,078,851 A | | 4/1937 | Hovey |
| 2,090,113 A | | 9/1937 | Dayton |
| 2,178,094 A | * | 10/1939 | Berluti |
| 2,204,882 A | * | 6/1940 | Berluti |
| 2,237,166 A | | 4/1941 | Schoenrock |
| 2,435,024 A | | 1/1948 | Wagner |
| 2,532,676 A | | 12/1950 | Schaieb |
| 2,542,643 A | | 2/1951 | Duncan |
| 2,726,099 A | * | 12/1955 | Nunn, Jr. |
| 3,362,728 A | | 1/1968 | Wing |
| 3,888,517 A | | 6/1975 | Ray |
| 3,923,112 A | | 12/1975 | Goodgame |
| 5,147,096 A | | 9/1992 | Rogers |

* cited by examiner

Primary Examiner—Kevin Hurley
(74) Attorney, Agent, or Firm—George S. Gray

(57) ABSTRACT

A coupling device is provided for receiving and securing a ball, the ball being attached to the structure to be coupled, such as a tow vehicle in the case of a trailer hitch application. Various embodiments of the device for both tongue and "goose neck" trailer hitch applications are included, which provide for simple and effective latching and unlatching, including operation from the perimeter of the vehicle. Hands free latching is provided for all coupling embodiments. A pivoting ball support is rotated and displaced as the ball enters the device, and is returned to a position whereby the ball is prevented from exiting the device. Various provisions are made for retaining the pivoting ball support in this position after such latching has occurred. Provisions for unlatching include various handles and hand pushed structure. Vertical adaptations are provided for use on gates and the like.

10 Claims, 33 Drawing Sheets

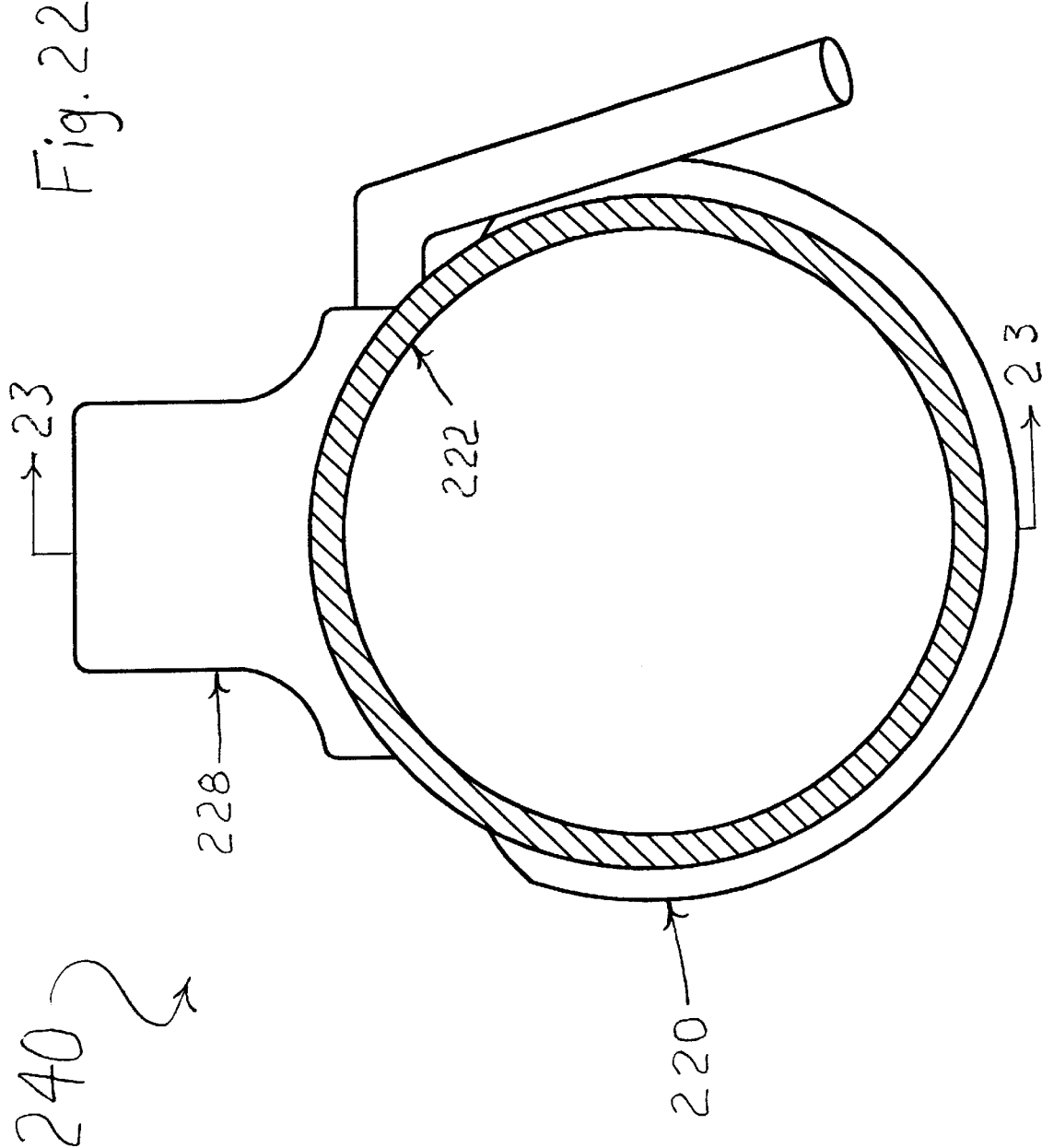

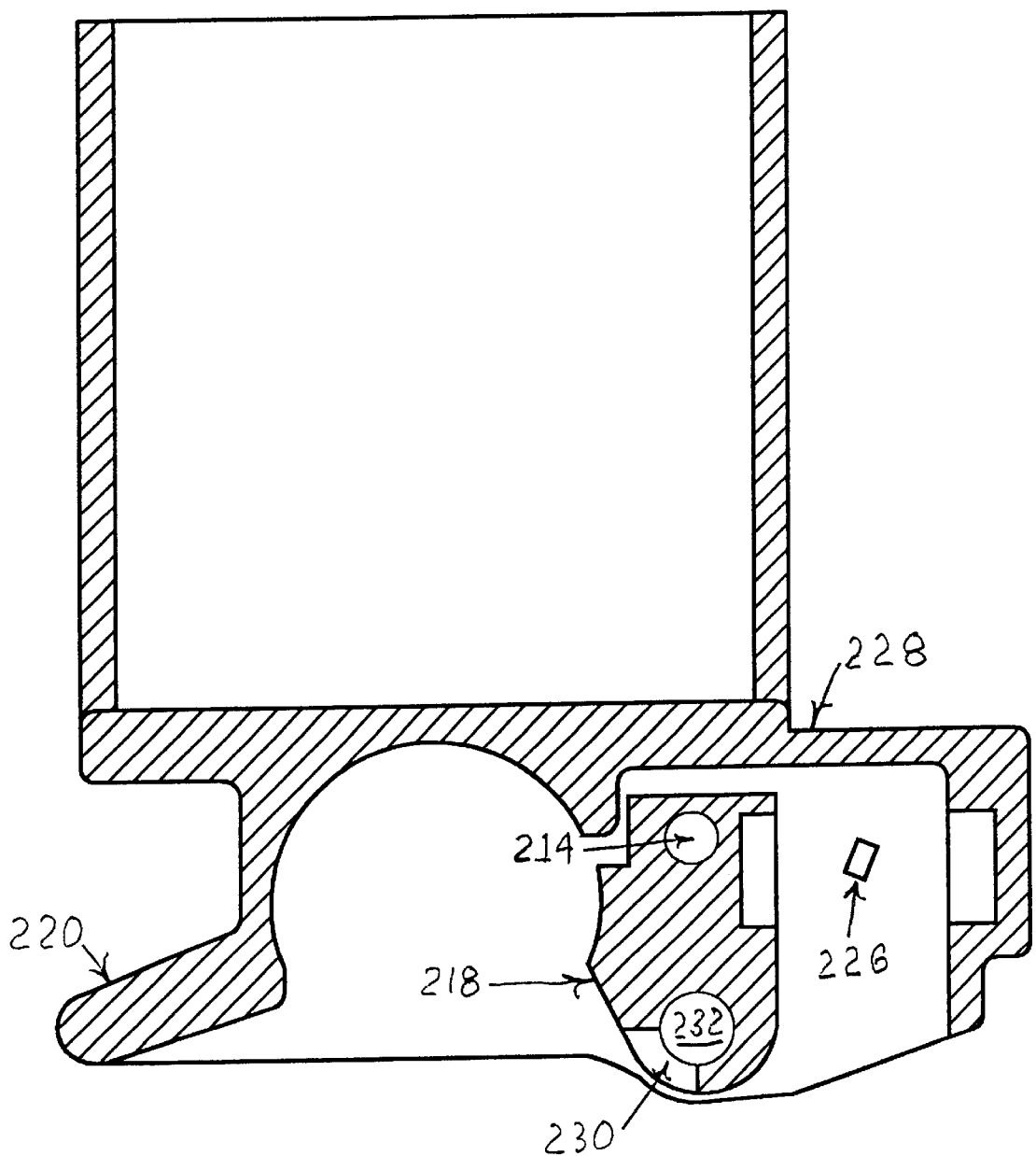

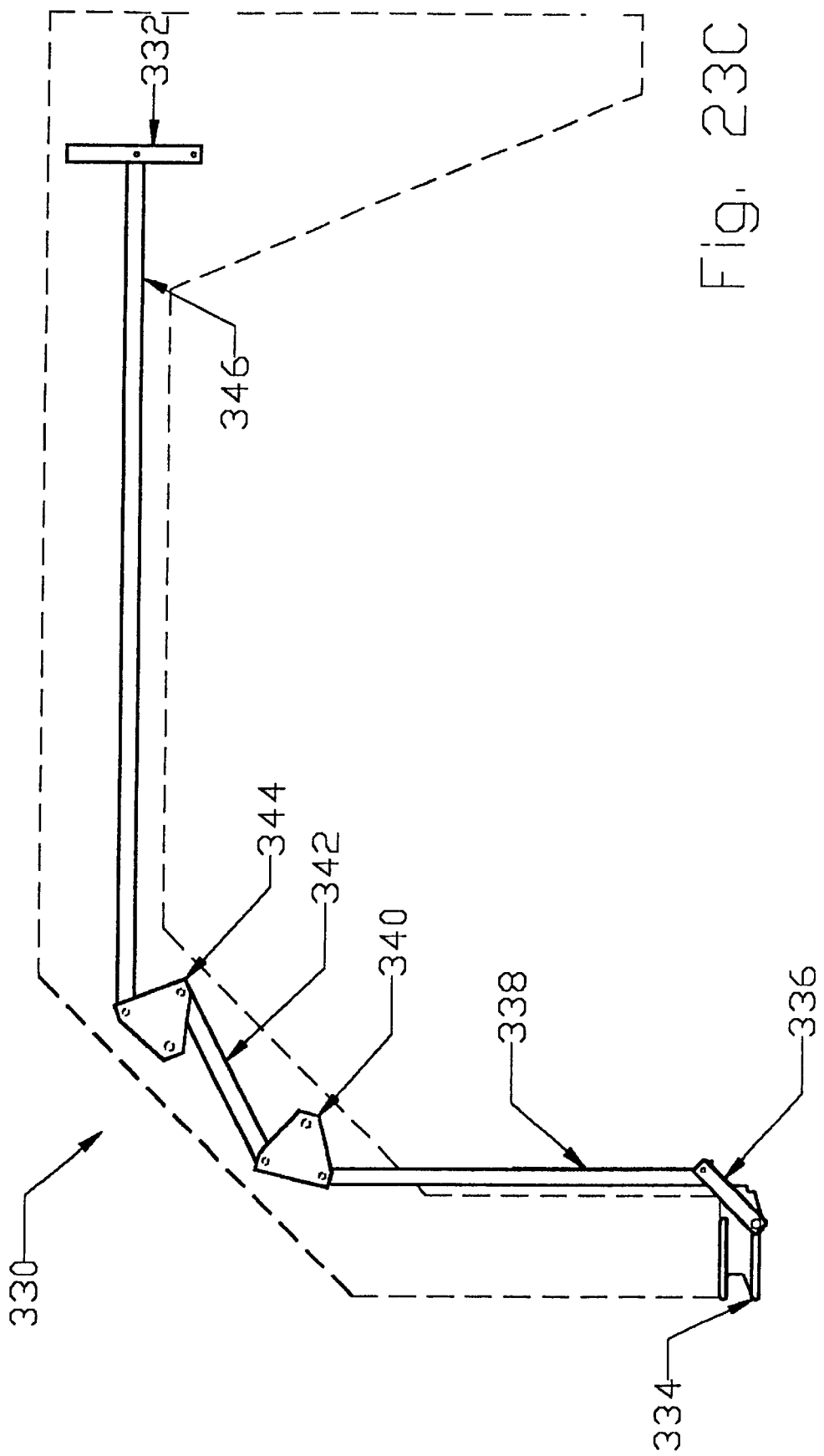

X-.676=R
Y+.238=R
(D+0.02)/2=R
D=DIAMETER OF BALL
R=RADIUS OF HOUSING

DEVICE FOR RECEIVING AND SECURING A BALL

REFERENCE TO PRIOR APPLICATIONS

The present application is a continuation-in-part of application Ser. No. 09/271,015 filed Mar. 23, 1998, which claim benefit to Provisional No. 60/078,993 filed Mar. 25, 1998 which claim benefit to Provisional No. 60/116,060 filed Jan. 15, 1999. The title of the application is "Device for Receiving and Securing A Hitch Ball. The inventors are David Richard Brown, Stacy Ray Brown, and Danny Richard Brown.

BACKGROUND OF THE INVENTION

This invention relates to a simple and convenient, tongue mounted receiving end of a "ball" hitch, of the type commonly used for trailers, recreational vehicles, and boats. The device is also adaptable to general coupling applications, e.g., gate and door fasteners, shelving, and other applications wherein it is desirable to couple two objects together simply and quickly. With regard to hitches in particular, many hitch devices are currently available which connect to the typical hitch ball. However, most of these include unduly complicated mechanisms, with many having a multiplicity of parts. Furthermore, most require manual manipulation of the device during the attachment process. In some, manual input is required to move the device from the open to the closed position.

It is a principal object of this invention to provide an easy-to-use hitch ball receiving mechanism, having an uncomplicated locking mechanism and a minimum of moving parts.

Another object is to provide a mechanism which requires no manual manipulation during the process in which the hitch ball is secured.

SUMMARY OF THE INVENTION

My invention is an easy-to-use coupling device having an uncomplicated latching mechanism and a minimum of moving parts. It is particularly suited for receiving a typical trailer hitch ball. My device requires no manual manipulation of the latching mechanism during the attachment of the device to a typical hitch ball.

My invention includes, without implied limitation of the claims, a device comprising a frame, with the frame having a front and rear interior section, and a frame opening, all being generally sized to allow the entry and close reception of a typical round hitch ball. A pivoting ball support has a pivot point attached to the frame such that the pivoting ball support moves in a substantially perpendicular manner with respect to the hitch ball. The face of the pivoting ball support is moved by such pivoting action from a first to a second position, the first position trapping the hitch ball within the frame front interior section, and the second position allowing the hitch ball to pass through the frame opening out of the frame interior.

Pivoting ball support movement resistance means resists movement of the pivoting ball support face from the first position to the second position.

Pivoting ball support forced rotation means allows the pivoting ball support face to be manually moved from the first to the second position.

In an alternative embodiment the pivoting ball support movement resistance means is replaced by pivoting ball support movement prevention means, such that movement of the pivoting ball support face, from its first position to its second position, is prevented.

Many features are contemplated by my invention, and may be included on one or more of the numerous and varied embodiments available.

The pivoting ball support face and pivoting ball support pivot point can be configured, with respect to the frame front interior section, such that hitch ball motion causes the pivoting ball support face to rotate around the pivoting ball support pivot point. In turn, this causes the pivoting ball support face to stay in, or move toward, the first position.

The pivoting ball support movement resistance means can comprise one or more springs positioned against and between the pivoting ball support and the frame interior section interior surface. Compression of the spring or springs would be required to move the pivoting ball support face from its first to its second position. This feature allows a "hands free" attachment since the spring action moves the pivoting ball support face back to its first position, the pivoting ball support face having been previously displaced to its second position by the hitch ball as the hitch ball entered the device.

The device may include a frame lip which is positioned to extend beneath a portion of the hitch ball, when the hitch ball is positioned within the frame front interior section. The frame lip may extend all portions of the front, sides, or both, of the frame front interior section.

The device may include a rear part of the frame front interior section interior surface, which extends downwardly between the front and rear interior sections. When the fully inserted hitch ball tries to move in a rearward direction, substantial portions of the hitch ball will encounter this rear part.

The frame lip and the frame front interior section interior surface rear part can be sized and shaped such that a line passing between the rearmost edge of each, passes below the center of the ball, when the line is drawn on a plane cut through the center of the fully inserted hitch ball.

The frame lip and the frame front interior section interior surface can be shaped and sized such that, during insertion, the hitch ball is urged to a position where a portion of the hitch ball is above the frame lip at the completion of the insertion process.

The frame lip may be of a concave shape, making a frame lip face that lies substantially flush with the fully inserted hitch ball.

The pivoting ball support face may be shaped and sized to closely follow the circumference of the hitch ball, when the circumference is in a plane cut through the center of the fully inserted hitch ball.

The frame opening can have a rear section corresponding generally with the frame rear interior section. The pivoting ball support can be sized and positioned such that its bottom end does not extend below the frame opening rear section.

The pivoting ball support forced rotation means can include a handle being attached to the pivoting ball support such that movement of the handle causes rotation of the pivoting ball support about its pivot point. Various embodiments can include single handles attached to the pivoting ball support pivot point or the pivoting ball support top extension, two handles attached at either end of the pivoting ball support pivot point, respectively, one handle connecting to both ends of the pivoting ball support pivot point, one or more handles disposed in a rearward direction with respect to the frame, one or more handles running in a forward direction with respect to the frame, handles which lie substantially flush to the frame, handles having gripping devices and attachments, and handles having a cross member oriented in a "T" shape.

A handle hook can also be included, which would receive and hold the handle.

One or more handles can also be configured such that the handle lies at an angle with respect to the longitudinal axis of the frame. This angle can be sufficient such that the handle can be gripped even if the frame is substantially flush to a horizontal surface.

The pivoting ball support movement prevention means can include a slot in the top of the frame, through which the pivoting ball support top extension protrudes. A hole in the pivoting ball top extension accepts a pin, and the hole is situated with respect to the frame such that the pin will be against the frame when the pivoting ball support face is in its first position.

The frame can have one or more top extensions which have holes aligning with the pivoting ball support top extension hole when the pivoting ball support face is in its first position. A pin or a lock in these aligned holes will prevent movement of the pivoting ball support.

A pivoting slot plug can be attached to the top of the frame. The slot plug can be rotated into and closely received by the frame slot. When in the frame slot, the slot plug prevents movement of the pivoting ball support.

According to one embodiment, there is provided an apparatus for receiving and securing a ball, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support pivot point and the pivoting ball support face being further configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position; and a rotation member, the rotation member being attached to the frame such that movement of the rotation member causes rotation of the pivoting ball support about the pivoting ball support pivot point.

According to a further embodiment the apparatus further comprises a frame exterior lip, the frame exterior lip being attached to the frame proximate the frame opening, the frame exterior lip further extending radially from the frame opening, the frame exterior lip being tapered downwardly as it extends.

According to a further embodiment, the pivoting ball support rotates with respect to the pivoting ball support pivot point, the pivoting ball support pivot point being fixed with respect to the frame.

According to one embodiment, the apparatus for receiving and securing a ball wherein the apparatus is used on a gooseneck trailer, comprising: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support pivot point and the pivoting ball support face being further configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point, the rotation member further comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to one embodiment, an apparatus for receiving and securing a ball is used on a gooseneck trailer, and comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support pivot point and the pivoting ball support face being further configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point, the rotation member further comprising: a handle; and means for providing hand-access to the handle at a predetermined distance from the pivoting ball support.

According to a further embodiment, the predetermined distance is greater than 2 feet.

According to a further embodiment, the predetermined distance is such that the handle is located at or outside the perimeter of the vehicle to which the gooseneck trailer is being coupled.

According to one embodiment, an apparatus for receiving and securing a ball is used on a gooseneck trailer, and comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support pivot point and the pivoting ball support face being further configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point, the rotation member further comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, an apparatus for receiving and securing a ball, comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member comprising a handle, the handle being pivotally attached to the frame and extending partially through the frame slot, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to a further embodiment, a plurality of springs is so positioned.

According to a further embodiment the apparatus of further comprises a frame exterior lip, the frame exterior lip being attached to the frame proximate the frame opening, the frame exterior lip further extending radially from the frame opening, the frame exterior lip being tapered downwardly as it extends.

According to one embodiment an apparatus for receiving and securing a ball is used on a gooseneck trailer, and comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point, the rotation member further comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to one embodiment, an apparatus for receiving and securing a ball is used on a gooseneck trailer, and comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point, the rotation member further comprising: a handle; and means for providing hand-access to the handle at a predetermined distance from the pivoting ball support.

According to a further embodiment, the predetermined distance is greater than 2 feet.

According to a further embodiment, the predetermined distance is such that the handle is located at or outside the perimeter of the vehicle to which the gooseneck trailer is being coupled.

According to one embodiment, an apparatus for receiving and securing a ball is used on a gooseneck trailer, and comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point, the rotation member further comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support pivot point and the pivoting ball support face being further configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to one embodiment, there is provided an apparatus for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support further having a top; a spring, the spring having a first and second end, the spring's first end being positioned against the pivoting ball support, the spring's second end being positioned against the frame rear interior section interior surface, such that movement of the pivoting ball support face from its first position to its second position is resisted; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to one embodiment, an apparatus is provided for receiving and securing a hitch ball, comprising: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: the frame, the frame further having a slot; the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to a further embodiment, the pivoting ball support movement resistance means comprises the pivoting ball support pivot point and the pivoting ball support face, the pivoting ball support pivot point and the pivoting ball support face being configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the hitch ball positioned in the frame front interior section.

According to a further embodiment, the apparatus further comprises the frame, the frame further having a frame front interior section interior surface, the frame front interior section interior surface having a rear part extending downwardly between the frame front and rear interior sections, such that, when the fully inserted hitch ball seeks to move in a rearward direction, substantial portions of the rear of the hitch ball will encounter the frame front interior section interior surface rear part.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted hitch ball, passes through or below the center of the ball.

According to a further embodiment, the apparatus further comprises the frame lip and the frame front interior section interior surface, the frame lip and the frame front interior section interior surface being shaped and sized such that, as the hitch ball is inserted into the frame front interior section, the frame front interior section interior surface urges the hitch ball to a position such that a portion of the hitch ball is above the frame lip when the hitch ball is fully inserted.

According to a further embodiment, the apparatus further comprises the frame, the frame further having a frame front interior section interior surface, the frame lip extending, in a generally arc shaped fashion, on and along the frame front interior section interior surface, approximately 45 degrees on either side of the longitudinal axis of the frame, when measured on a circle having a center coincident with the fully inserted hitch ball's center.

According to a further embodiment, the apparatus further comprises the frame lip, the frame lip further having a frame lip face, the frame lip face being generally concave and sized such that the frame lip face is substantially flush with the fully inserted hitch ball.

According to a further embodiment, the apparatus further comprises the frame, the frame further having a frame front interior section interior surface, the frame front interior section interior surface having a rear part extending downwardly between the frame front and rear interior sections, such that, when the fully inserted hitch ball seeks to move in a rearward direction, substantial portions of the rear of the hitch ball will encounter the frame front interior section interior surface rear part.

According to a further embodiment, the frame front interior section interior surface rear part extends from 15 degrees to 90 degrees along the circumference of a circle having a center coincident with the center of the fully inserted hitch ball.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the hitch ball positioned in the frame front interior section.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted hitch ball, passes below the center of the ball.

According to a further embodiment, the apparatus further comprises the frame lip and the frame front interior section interior surface, the frame lip and the frame front interior section interior surface being shaped and sized such that, as the hitch ball is inserted into the frame front interior section, the frame front interior section interior surface urges the hitch ball to a position such that a portion of the hitch ball is above the frame lip when the hitch ball is fully inserted.

According to a further embodiment, the apparatus further comprises the pivoting ball support face, the pivoting ball support face being further shaped and sized to closely follow the circumference of the adjacent portions of the hitch ball, in a plane cut through the center of the fully inserted hitch ball.

According to a further embodiment, the pivoting ball support face follows the hitch ball circumference through at least 30 degrees.

According to a further embodiment, the apparatus further comprises the pivoting ball support and the frame opening, the pivoting ball support further having a bottom end and the frame opening further having a rear section corresponding generally with the frame rear interior section, the pivoting ball support being further sized and positioned such that the pivoting ball support bottom end does not extend below the frame opening rear section.

According to a further embodiment, the pivoting ball support movement resistance means comprises: the frame, the frame further having a frame rear interior section interior surface; and a plurality of springs, the springs each having a first and second end, each spring's first end being positioned against the pivoting ball support, each spring's second end being positioned against the frame rear interior section interior surface.

According to a further embodiment, the pivoting ball support is positioned such that its clockwise rotation about the pivoting ball support pivot point moves the pivoting ball support from its first position to its second position.

According to a further embodiment, the apparatus further comprises pivoting ball support movement prevention means, such that movement of the pivoting ball support face from the first position to the second position is prevented.

According to a further embodiment, the apparatus further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to a further embodiment, the apparatus further comprises a pivoting ball support stop, the pivoting ball support stop being attached to the frame interior rear section and positioned such that movement of the pivoting ball support is halted when the pivoting ball support encounters the pivoting ball support stop.

According to a further embodiment, the pivoting ball support rotates with respect to the pivoting ball support pivot point, the pivoting ball support pivot point being fixed with respect to the frame.

According to a further embodiment, the apparatus further comprises a channel structure, the channel structure being attached to the frame and extending rearwardly, the channel structure being shaped to closely receive all or a portion of each of three sides of a rectangular structure.

According to a further embodiment, the apparatus further comprises an A-frame structure, the channel structure being attached to the frame and extending rearwardly, the A-frame structure being shaped to closely receive a V-shaped structure.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: a handle; and means for providing hand-access to the handle at a predetermined distance from the pivoting ball support.

According to a further embodiment, the predetermined distance is greater than 2 feet.

According to a further embodiment, the predetermined distance is such that the handle is located at or outside the perimeter of the vehicle to which the gooseneck trailer is being coupled.

According to one embodiment the apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, an apparatus for receiving and securing a hitch ball, comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising: the frame, the frame further having a slot; the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to a further embodiment, the apparatus further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to a further embodiment the pivoting ball support rotates with respect to the pivoting ball support pivot point, the pivoting ball support pivot point being fixed with respect to the frame.

According to one embodiment, an apparatus for receiving and securing a hitch ball is used with a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to one embodiment, an apparatus for receiving and securing a hitch ball is used with a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevent the hitch ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising: a handle; and means for providing hand-access to the handle at a predetermined distance from the pivoting ball support.

According to a further embodiment, the predetermined distance is greater than 2 feet.

According to a further embodiment, the predetermined distance is such that the handle is located at or outside the perimeter of the vehicle to which the gooseneck trailer is being coupled.

According to one embodiment, an apparatus for receiving and securing a hitch ball is used with a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support pivot point and the pivoting ball support face being further configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point, the rotation member comprising: a handle; and means for providing hand-access to the handle at a predetermined distance from the pivoting ball support.

According to a further embodiment, the predetermined distance is greater than 2 feet.

According to a further embodiment, the predetermined distance is such that the handle is located at or outside the perimeter of the vehicle to which the gooseneck trailer is being coupled.

According to a further embodiment, the apparatus further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to a further embodiment, the pivoting ball support rotates with respect to the pivoting ball support pivot point, the pivoting ball support pivot point being fixed with respect to the frame.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support pivot point and the pivoting ball support face being further configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point, the rotation member comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support pivot point and the pivoting ball support face being further configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position; and a rotation member, the rotation member being attached to the pivoting ball support such that movement of the rotation member causes rotation of the pivoting ball support about the pivoting ball support pivot point, the rotation member comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point, the rotation member comprising: a handle; and means for providing hand-access to the handle at a predetermined distance from the pivoting ball support.

According to a further embodiment, the predetermined distance is greater than 2 feet.

According to further embodiment, the predetermined distance is such that the handle is located at or outside the perimeter of the vehicle to which the gooseneck trailer is being coupled.

According to a further embodiment, a plurality of springs is so positioned.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point, the rotation member comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to a further embodiment, the pivoting ball support rotates with respect to the pivoting ball support pivot point, the pivoting ball support pivot point being fixed with respect to the frame.

According to a further embodiment the apparatus of further comprises a frame exterior lip, the frame exterior lip being attached to the frame proximate the frame downwardly facing opening, the frame exterior lip further extending radially from the frame downwardly facing opening, the frame exterior lip being tapered downwardly as it extends.

According to one embodiment, an apparatus for receiving and securing a hitch ball is used on a gooseneck trailer, and comprises: a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member, the rotation member being attached to the pivoting ball support such that movement of the rotation member causes rotation of the pivoting ball support about the pivoting ball support pivot point, the rotation member comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, a hitch, comprises: a ball; a frame, the frame having an interior, the frame interior having a front section and a rear section, the frame front interior section being shaped and sized for closely receiving portions of the hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: the frame, the frame further having a slot; the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to one embodiment, a hitch is for use on a gooseneck trailer, and comprises: a ball; a frame, the frame having an interior, the frame interior having a front section and a rear section, the frame front interior section being shaped and sized for closely receiving portions of the hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; and a fourth member having a first end and a handle end, the fourth member first end being hinged to the third member such that, when the fourth member handle end is pulled, the third member rotates causing the second member to move the first member.

According to a further embodiment, the handle end is hinged to the fourth member and to the gooseneck trailer.

According to one embodiment, a hitch is provided for use on a gooseneck trailer, and comprises: a ball; a frame, the frame having an interior, the frame interior having a front section and a rear section, the frame front interior section being shaped and sized for closely receiving portions of the hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: a handle; and means for providing hand-access to the handle at a predetermined distance from the pivoting ball support.

According to a further embodiment, the predetermined distance is greater than 2 feet.

According to a further embodiment, the predetermined distance is such that the handle is located at or outside the perimeter of the vehicle to which the gooseneck trailer is being coupled.

According to one embodiment, a hitch is provided for use on a gooseneck trailer, and comprises: a ball; a frame, the frame having an interior, the frame interior having a front section and a rear section, the frame front interior section being shaped and sized for closely receiving portions of the hitch ball, the frame further having a downwardly facing opening, the frame opening being shaped and positioned to allow hitch ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: a first member having a first and second end, the first member first end being attached to the pivoting ball support pivot point such that movement of the first member moves the pivoting ball support from its first position to its second position; a second member having a first end and a second end, the second member first end being hinged to the first member second end; a third member, the third member being hinged to the gooseneck trailer, the third member being further hinged to the second member second end; a fourth member having a first end and a second end, the fourth member first end being attached to the third member; a fifth member, the fifth member being hinged to the gooseneck trailer, the fifth member being further hinged to the fourth member second end; and a sixth member having a first end and a handle end, the sixth member first end being hinged to the fifth member such that, when the sixth member handle end is pulled, the fifth member and third member rotate, causing the second member to move the first member.

According to a further embodiment, the handle end is hinged to the sixth member and to the gooseneck trailer.

According to one embodiment, an apparatus for receiving and securing a ball, comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: the frame, the frame further having a slot; the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to a further embodiment, the pivoting ball support movement resistance means comprises the pivoting ball support pivot point and the pivoting ball support face, the pivoting ball support pivot point and the pivoting ball support face being configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the ball positioned in the frame front interior section.

According to a further embodiment, the apparatus further comprises the frame, the frame further having a frame front interior section interior surface, the frame front interior section interior surface having a rear part extending between the frame front and rear interior sections, such that, when the fully inserted ball seeks to move in a rearward direction, substantial portions of the rear of the ball will encounter the frame front interior section interior surface rear part.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted ball, passes through or below the center of the ball.

According to a further embodiment, the apparatus further comprises the frame lip and the frame front interior section interior surface, the frame lip and the frame front interior section interior surface being shaped and sized such that, as the ball is inserted into the frame front interior section, the frame front interior section interior surface urges the ball to a position such that a portion of the ball is above the frame lip when the ball is fully inserted.

According to a further embodiment, the apparatus further comprises the frame, the frame further having a frame front interior section interior surface, the frame lip extending, in a generally arc shaped fashion, on and along the frame front interior section interior surface, approximately 45 degrees on either side of the longitudinal axis of the frame, when measured on a circle having a center coincident with the fully inserted ball's center.

According to a further embodiment, the apparatus further comprises the frame lip, the frame lip further having a frame lip face, the frame lip face being generally concave and sized such that the frame lip face is substantially flush with the fully inserted ball.

According to a further embodiment, the apparatus further comprises the frame, the frame further having a frame front interior section interior surface, the frame front interior section interior surface having a rear part extending downwardly between the frame front and rear interior sections, such that, when the fully inserted ball seeks to move in a rearward direction, substantial portions of the rear of the ball will encounter the frame front interior section interior surface rear part.

According to a further embodiment, the frame front interior section interior surface rear part extends from 15 degrees to 90 degrees along the circumference of a circle having a center coincident with the center of the fully inserted ball.

According to a further embodiment, the pivoting ball support movement resistance means further comprises the frame, the frame further having a frame rear interior section interior surface, and a spring, the spring having a first and second end, the spring's first end being positioned against the pivoting ball support, the spring's second end being positioned against the frame rear interior section interior surface.

According to a further embodiment, the apparatus further comprises the frame, the frame further having a lip, the frame lip being shaped and positioned to extend beneath a portion of the ball positioned in the frame front interior section.

According to a further embodiment, the apparatus further comprises the frame lip, the frame lip further having a rearmost edge, and the frame front interior section interior surface, the frame front interior section interior surface further having a rearmost edge, the frame lip rearmost edge and the frame front interior section interior surface rearmost edge being sized and shaped such that a line between such edges, lying on a plane cut through the center of the fully inserted ball, passes below the center of the ball.

According to a further embodiment, the apparatus further comprises the frame lip and the frame front interior section interior surface, the frame lip and the frame front interior section interior surface being shaped and sized such that, as the ball is inserted into the frame front interior section, the frame front interior section interior surface urges the ball to a position such that a portion of the ball is above the frame lip when the ball is fully inserted.

According to a further embodiment, the apparatus further comprises the pivoting ball support face, the pivoting ball support face being further shaped and sized to closely follow the circumference of the adjacent portions of the ball, in a plane cut through the center of the fully inserted ball.

According to a further embodiment, the pivoting ball support face follows the ball circumference through at least 30 degrees.

According to a further embodiment, the apparatus further comprises the pivoting ball support and the frame opening, the pivoting ball support further having a bottom end and the frame opening further having a rear section corresponding generally with the frame rear interior section, the pivoting ball support being further sized and positioned such that the pivoting ball support bottom end does not extend below the frame opening rear section.

According to a further embodiment, the pivoting ball support movement resistance means comprises: the frame, the frame further having a frame rear interior section interior surface; and a plurality of springs, the springs each having a first and second end, each spring's first end being positioned against the pivoting ball support, each spring's second end being positioned against the frame rear interior section interior surface.

According to a further embodiment, the pivoting ball support is positioned such that its clockwise rotation about the pivoting ball support pivot point moves the pivoting ball support from its first position to its second position.

According to a further embodiment, the apparatus further comprises pivoting ball support movement prevention means, such that movement of the pivoting ball support face from the first position to the second position is prevented.

According to a further embodiment, the apparatus further comprises a frame exterior lip, the frame exterior lip being attached to the frame proximate the frame opening, the frame exterior lip further extending radially from the frame opening, the frame exterior lip being tapered downwardly as it extends.

According to a further embodiment, the apparatus further comprises a pivoting ball support stop, the pivoting ball support stop being attached to the frame interior rear section and positioned such that movement of the pivoting ball support is halted when the pivoting ball support encounters the pivoting ball support stop.

According to a further embodiment, the pivoting ball support rotates with respect to the pivoting ball support pivot point, the pivoting ball support pivot point being fixed with respect to the frame.

According to a further embodiment, the apparatus further comprises a channel structure, the channel structure being attached to the frame and extending rearwardly, the channel structure being shaped to closely receive all or a portion of each of three sides of a rectangular structure.

According to a further embodiment, the apparatus further comprises an A-frame structure, the channel structure being attached to the frame and extending rearwardly, the A-frame structure being shaped to closely receive a V-shaped structure.

According to one embodiment, an apparatus for receiving and securing a ball, comprises: a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising: the frame, the frame further having a slot; the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

According to a further embodiment, the apparatus further comprises a frame exterior lip, the frame exterior lip being attached to the frame proximate the frame opening, the frame exterior lip further extending radially from the frame opening, the frame exterior lip being tapered downwardly as it extends.

According to a further embodiment the pivoting ball support rotates with respect to the pivoting ball support pivot point, the pivoting ball support pivot point being fixed with respect to the frame.

According to one embodiment is a coupling device, comprising: a ball; a frame, the frame having an interior, the frame interior having a front section and a rear section, the frame front interior section being shaped and sized for closely receiving portions of the ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening; pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising: the frame, the frame further having a slot; the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

DESCRIPTION OF THE DRAWINGS

FIG. 22 is a top view of the embodiment of the device shown in FIG. 17, including a cut away view of the added top structure.

FIG. 23 is a side view of the embodiment of the device shown in FIG. 22, cut along cutting plane 23—23.

FIG. 23C is a side view of an additional remote access handle embodiment shown in its attached position on the gooseneck trailer structure.

DESCRIPTION OF THE INVENTION

Figure 1:
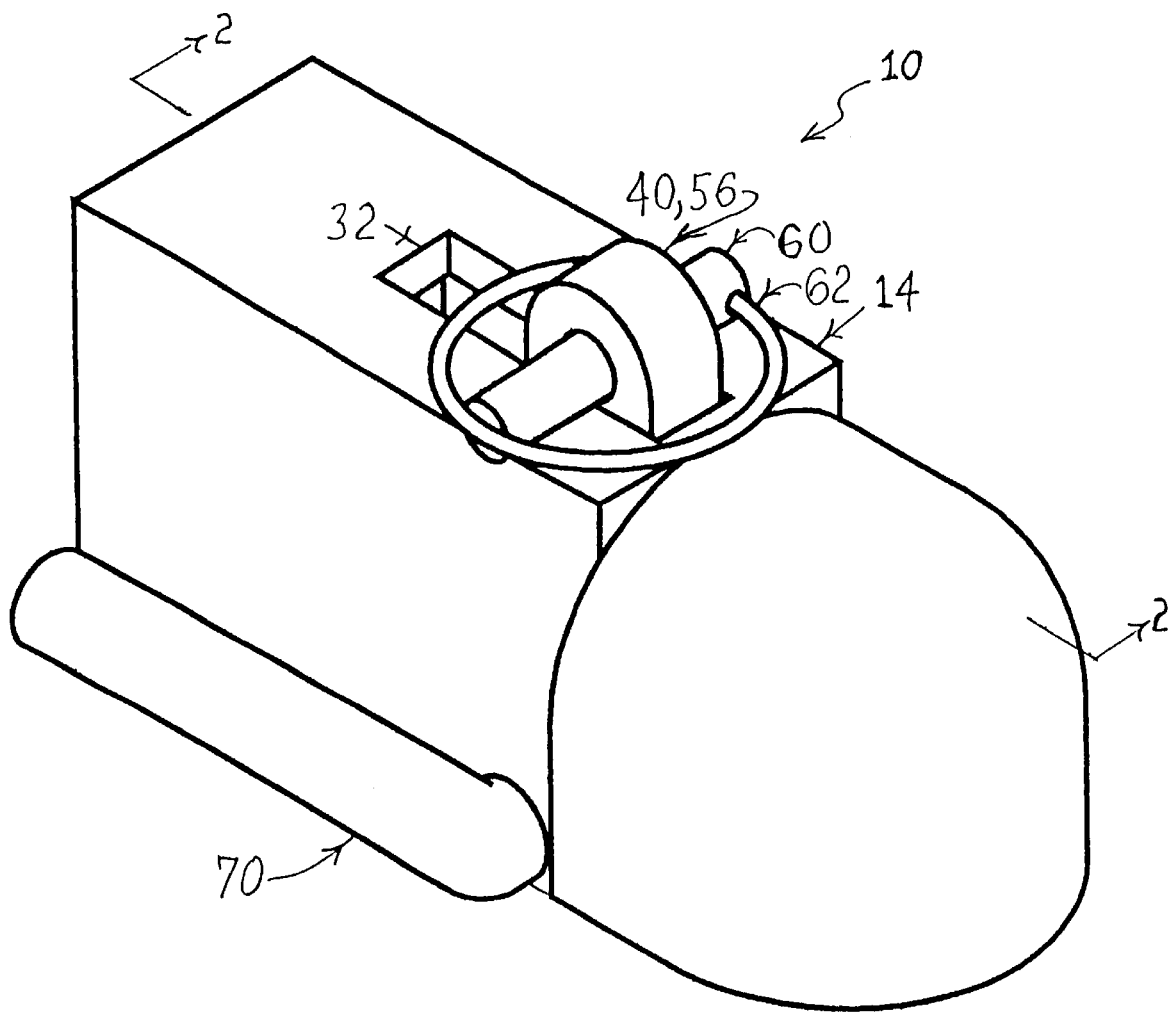
FIG. 1 is an oblique view of an embodiment of the device.
Figure 2:
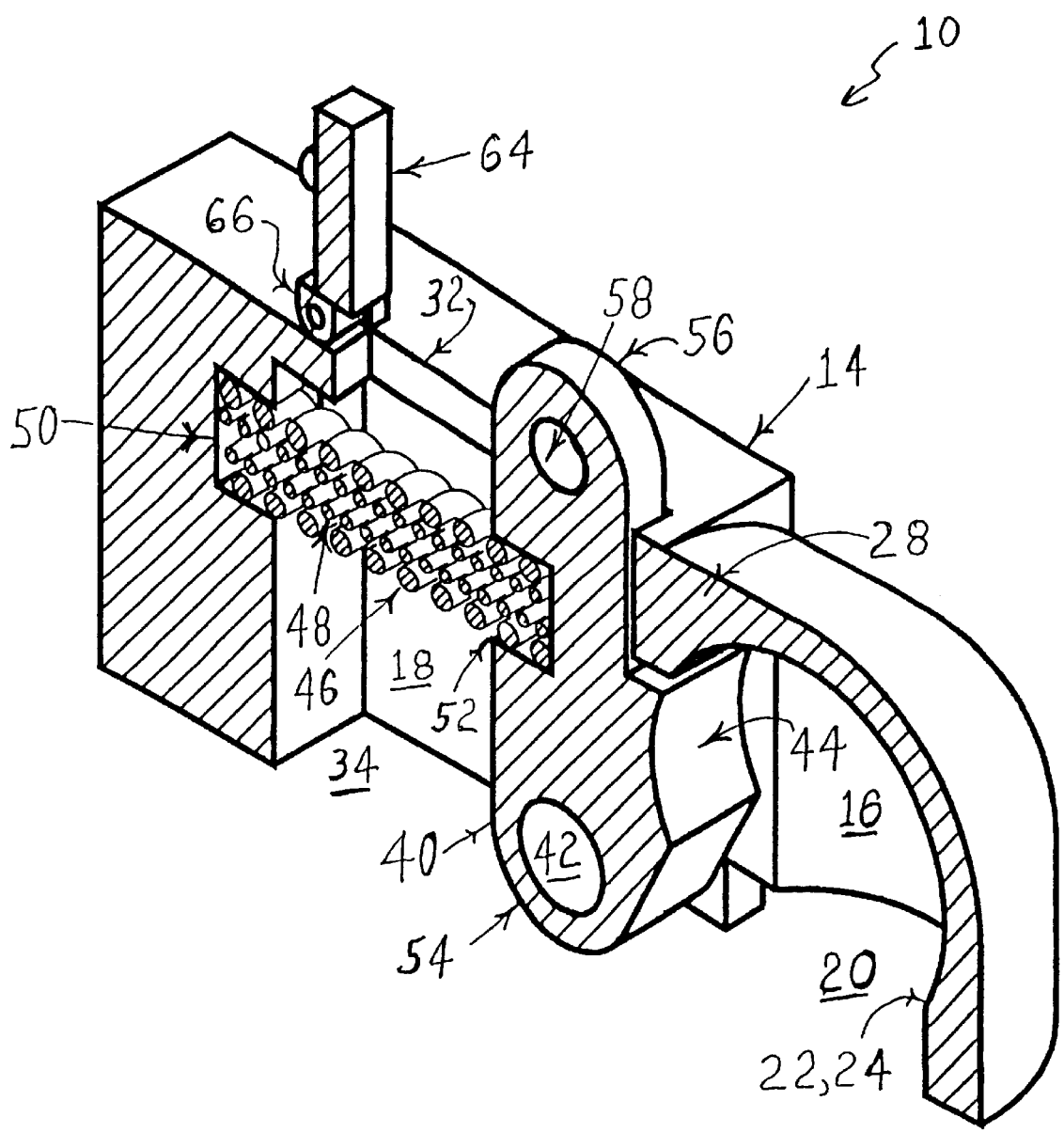
FIG. 2 is an oblique view of an embodiment of the device, cut along cutting plane 2—2.
Figure 3:
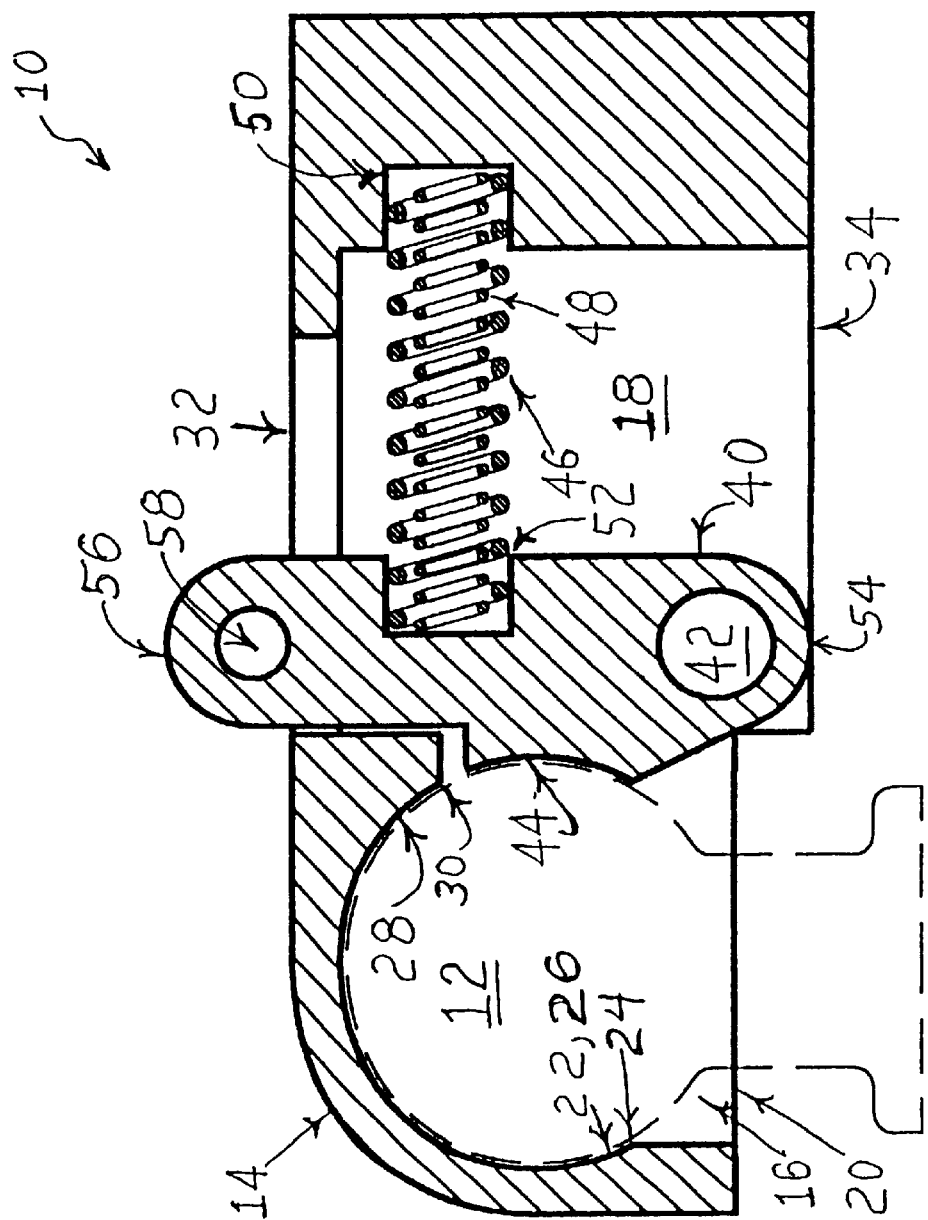
FIG. 3 is a side view of an embodiment of the device, cut along cutting plane 2—2, depicting the latching mechanism in the closed position.
Figure 4:
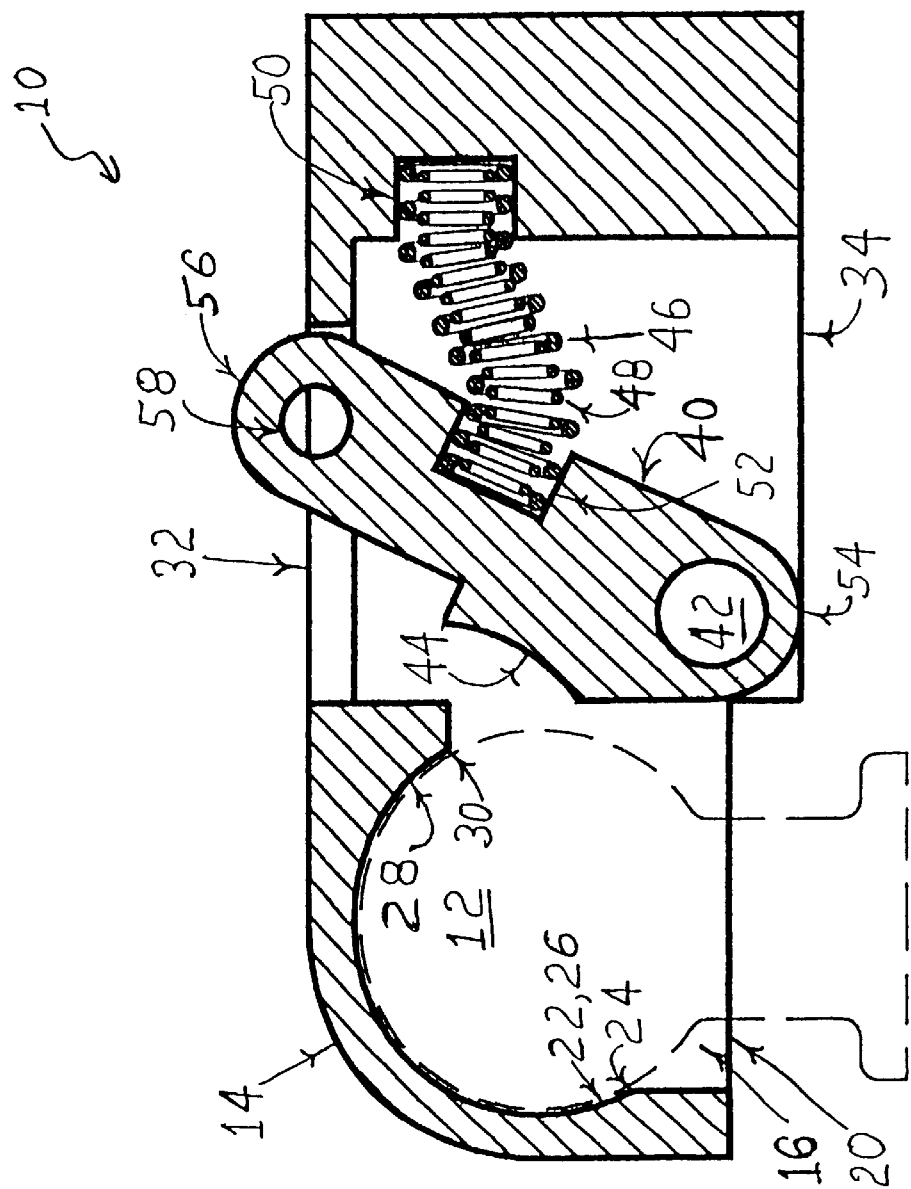
FIG. 4 is a side view of an embodiment of the device cut along cutting plane 2—2, depicting the latching mechanism in the open position.

FIGS. 1–4 depict an embodiment of the device 10, with FIGS. 3–4 showing a typical hitch ball 12. FIGS. 2–4 show the configuration of the frame 14, the frame front section interior 16, the frame rear section interior 18, and the frame opening 20. The frame 14 can be made of a number of materials, including, but not limited to, cast steel, stainless steel, weldable steel, pressed steel, and mild steel. In the embodiment depicted in FIGS. 1–17 and 22–30, cast steel has been chosen for the frame 14. The embodiment depicted in FIGS. 24–27 utilizes pressed steel. FIGS. 2–4 depict additional frame features such as the frame lip 22, the frame lip rearmost edge 24, the frame lip face 26, the frame front interior section interior surface rear part 28, the frame front interior section interior surface rearmost edge 30, the frame slot 32, and the frame opening rear section 34. The frame lip 22 extends radially around the front portion of the frame front section interior 16, and is generally a continuation of the "dome" which forms the top of the frame front section interior 16. The frame lip face 26 is somewhat concave, allowing a generally flush fit against a fully inserted hitch ball 12. In the embodiment depicted, the frame front interior section interior surface rear part 28, extends approximately 62 degrees from vertical, and generally follows the circumference of the hitch ball 12, as shown in FIGS. 3–4. In the embodiment depicted therein, a line drawn from the frame lip rearmost edge 24 to the frame front interior section interior surface rearmost edge 30 will pass beneath the center of a fully inserted hitch ball 12.

FIG. 1 depicts the position of the frame slot 32 with respect to the pivoting ball support 40. The pivoting ball support 40 rotates with the pivoting ball support pivot point 42 from a first position, in which the pivoting ball support face 44 is in close proximity to the hitch ball 12, to the second position, in which the pivoting ball support face 44 is dislocated, allowing the hitch ball 12 to be removed from the frame front section interior 16 through frame opening 20. The pivoting ball support face 44 first position and second position are depicted in FIG. 3 and FIG. 4, respectively.

In the embodiment shown in FIGS. 1–4, the movement of the pivoting ball support 40 is resisted by a first spring 46 and a second spring 48. The second spring 48 provides a backup means for resisting movement of the pivoting ball support 40 from its first position to its second position. FIGS. 2–4 depict an embodiment in which the ends of both springs are held in place by the first notch 50 and a second notch 52 cut into the frame rear section interior 18 and the pivoting ball support face 44. Other embodiments could easily include springs 46,48 being attached to the frame rear section interior 18 and the pivoting ball support 40, by normal attachment means, including screws, bolts, hooks, or welding. Embodiments are also anticipated that will use only one spring 46, and one or more springs having a rod within the spring 46, with an accompanying hole, for rod movement extending rearwardly into the frame 14 from the frame rear section interior 18.

Although springs 46,48 are substantially horizontal with respect to the frame 14, in the embodiment depicted in FIGS. 2–4, other embodiments are anticipated which would place one or more such springs 46,48 in a non-horizontal position, including embodiments in which the springs 46,48 would have a bend provided, when the pivoting ball support face 44 is in its first position.

FIGS. 2–4 also depict the pivoting ball support bottom end 54, the pivoting ball support top extension 56, and the pivoting ball support top extension hole 58. In the embodiment depicted in FIGS. 1–4, a pin 60, connectable to the frame by a pin cable (not shown), will be against the frame 14 when inserted into pivoting ball support top extension hole 58. Attached to the pin is a pin ring 62 which is sized to fit snugly against the unattached pin 60 end, as shown in FIG. 1.

It is anticipated that the pivoting ball support 40 will also be made of cast steel, although other materials will suffice as described earlier.

In the embodiment depicted in FIGS. 1–4, a handle 70 is provided which provides the means by which the pivoting ball support face 44 is rotated from its first position to its second position, to allow the hitch ball 12 to be removed from the device 10. The handle 70 connects to the pivoting ball support pivot point 42. It is anticipated in other embodiments that several types of handles will be utilized. One or more handles connected to both ends of the pivoting ball support pivot point 42, one or more handles connected to the pivoting ball support top extension 56, handles directed in a forward direction along the frame 14, handles having a "T" shaped cross piece for improved gripping, other grip devices attached to handles, and handles having one or more bends for routing the handle to various desirable locations.

Another anticipated embodiment includes a handle which is elevated from approximately 15 to 50 degrees from the horizontal when the pivoting ball support 40 is in its first position. This embodiment contemplates a sufficient angle from the horizontal to allow the handle to be gripped when the frame 14 is substantially flush to a horizontal object, which would otherwise prevent the handle from being gripped.

It is also anticipated that a handle hook (not shown) will be provided which will receive and secure the end of the handle, as well as other anticipated handles. Handle hooks can be anticipated to include a number of structures including semi-circular extensions from the frame that are positioned where the handle can be moved to rest within the semi-circle, thus having its movement restricted, squeeze clamps in which the handle shaft can be forced between the squeezing edges of such a clamp, a notch in the frame having an elevation at the entry which would prevent lateral movement of the handle without a preceding vertical movement, and other readily available means for securing a shaft in a fixed position.

Figure 5:
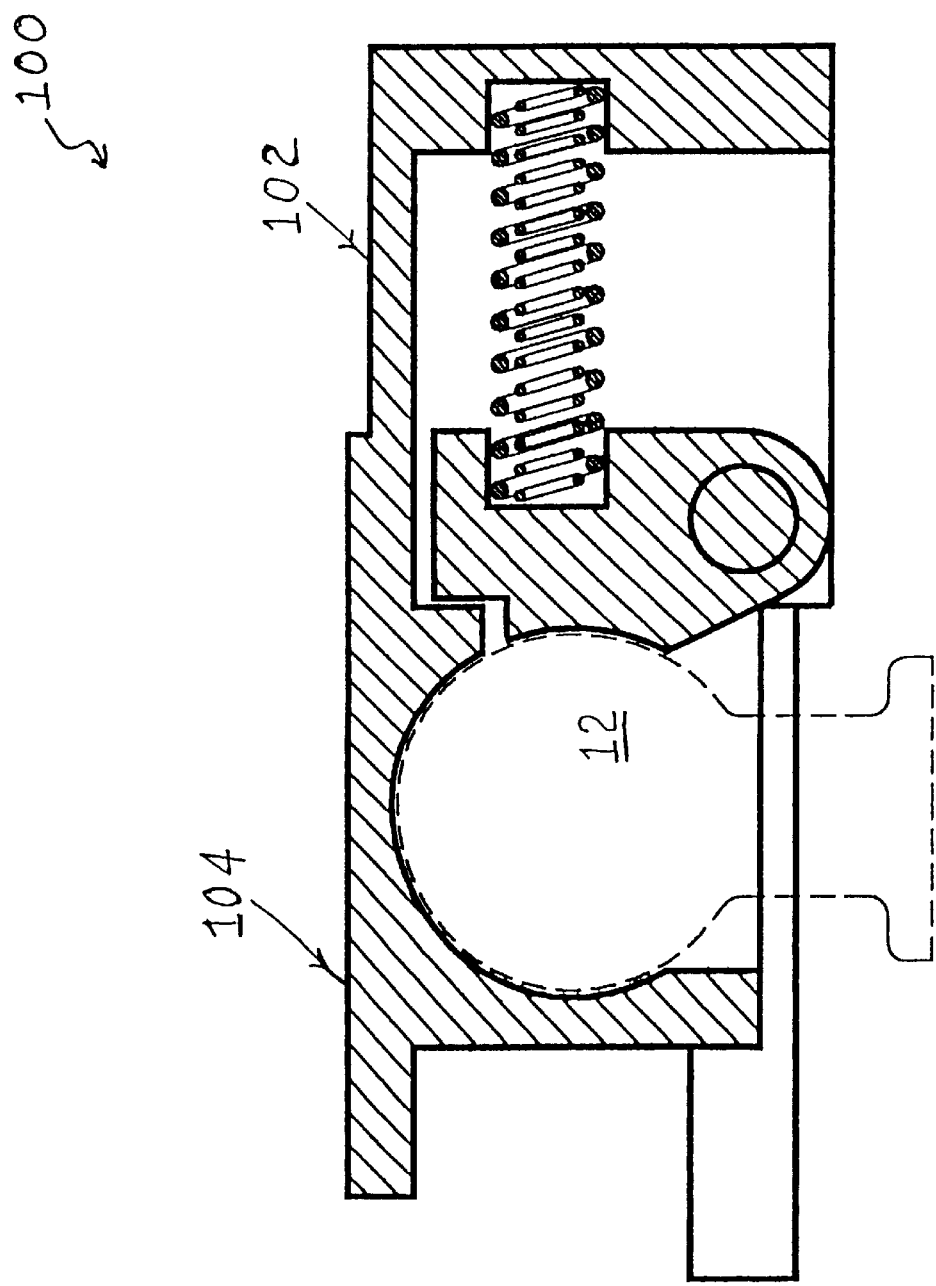
FIG. 5 is a cutaway side view of an embodiment of the device showing a gooseneck adaptation.

FIG. 5 shows a "gooseneck" adaptation 100. In this embodiment the frame 102 has a top 104 connectable to a pipe typically used in gooseneck installations, where the upwardly extending pipe from the device 100 would telescope into another pipe, both pipes having appropriately spaced holes for adjustment of the height of the installed device.

Figure 6:
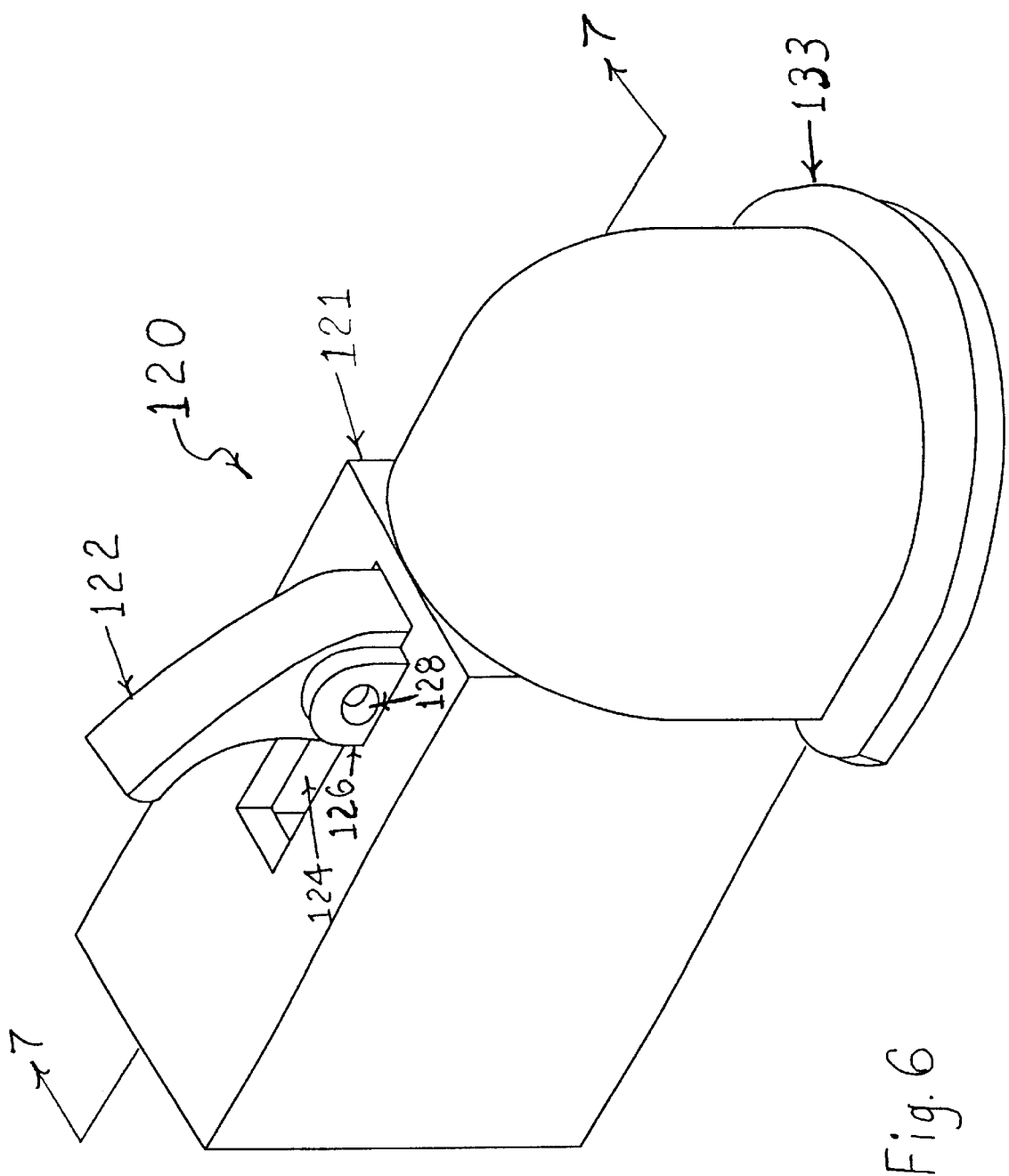
FIG. 6 is an oblique view of an embodiment of the device.
Figure 7:
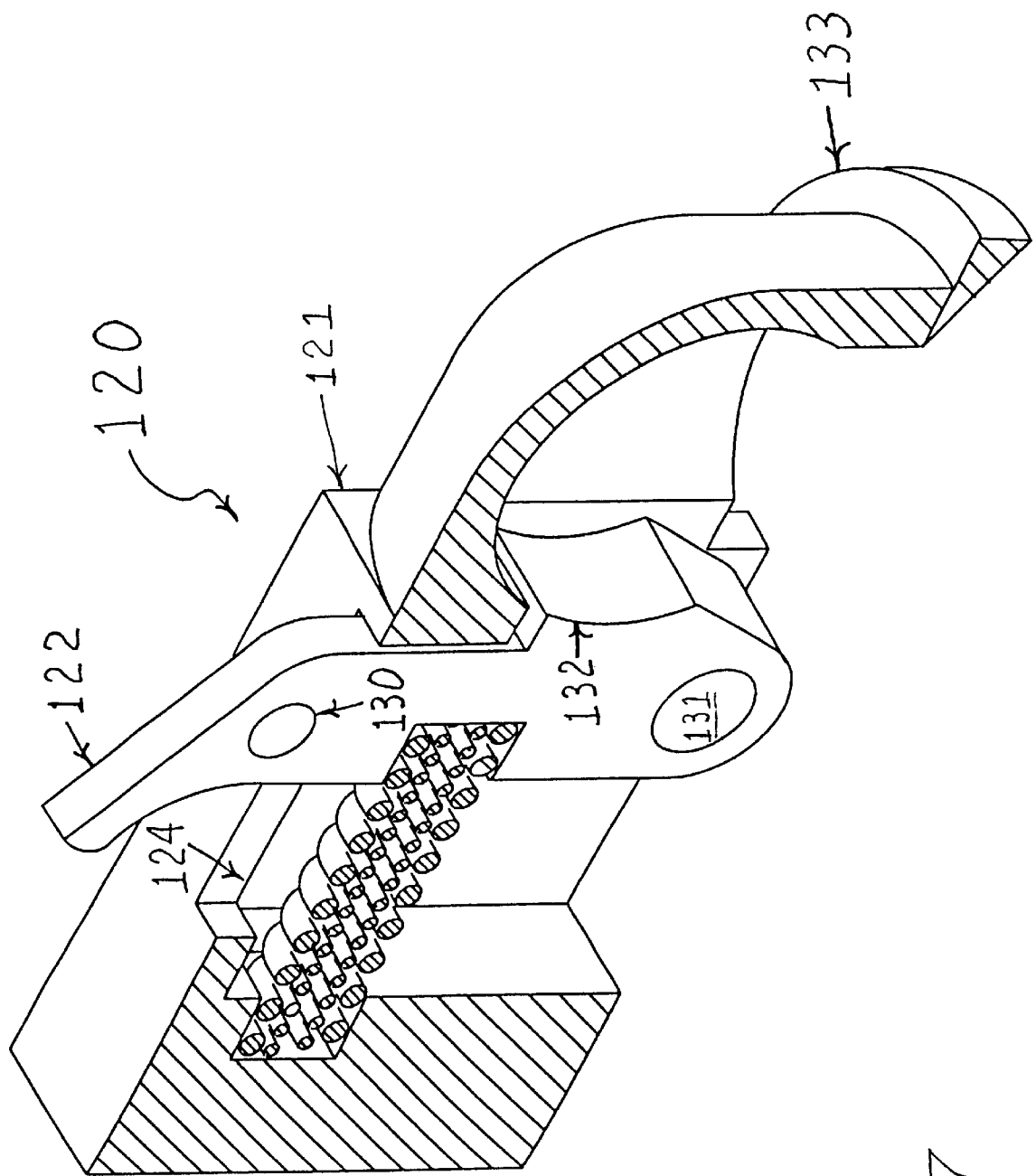
FIG. 7 is an oblique view of an embodiment of the device, cut along cutting plane 7—7.
Figure 8:
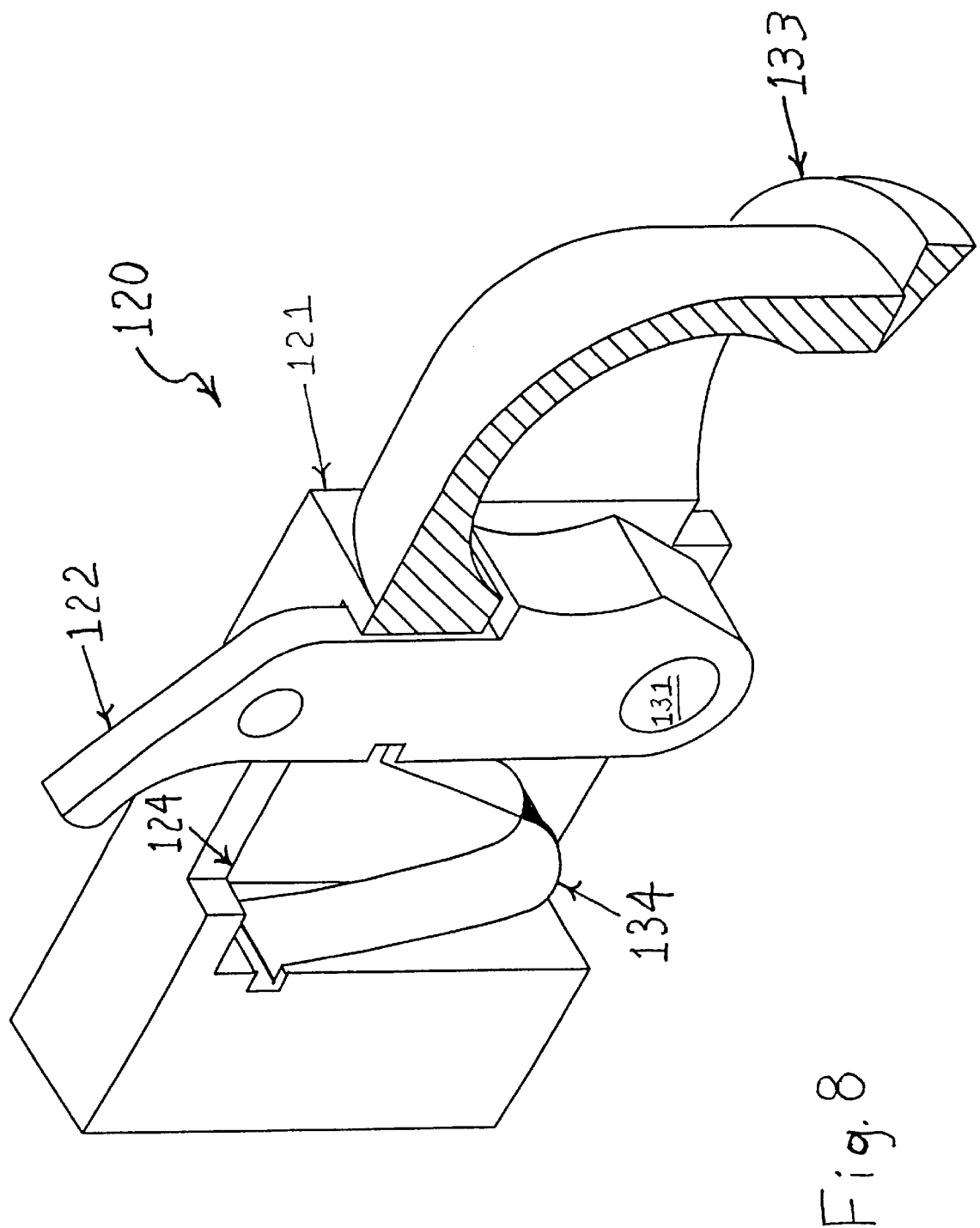
FIG. 8 is an oblique view of an embodiment of the device, cut along cutting plane 7—7.

FIGS. 6–8 depict an additional embodiment 120 of the invention wherein the pivoting ball support 122 extends upwardly through a frame slot 124 such that the pivoting ball support 122 can be pushed by hand to move the pivoting ball support 122 from its first position to its second position. In this embodiment no handle is needed and the pivoting ball support 122 need not rotate with the pivoting ball support pivot point 131. For this reason, the pivoting ball support pivot point 131 may be welded or otherwise affixed to the frame 121.

FIG. 6 also depicts a frame top extension 126 having a hole 128 positioned adjacent the pivoting ball support top extension hole 130, such that a pin or lock can be inserted simultaneously through both holes 128,130, thus locking the pivoting ball support face 132 into its first position. An exterior frame lip 133 provides structural rigidity and assists in guiding the hitch ball during the hookup process.

FIG. 8 depicts a U-spring 134, which may be adapted to all embodiments of the invention.

Figure 9:
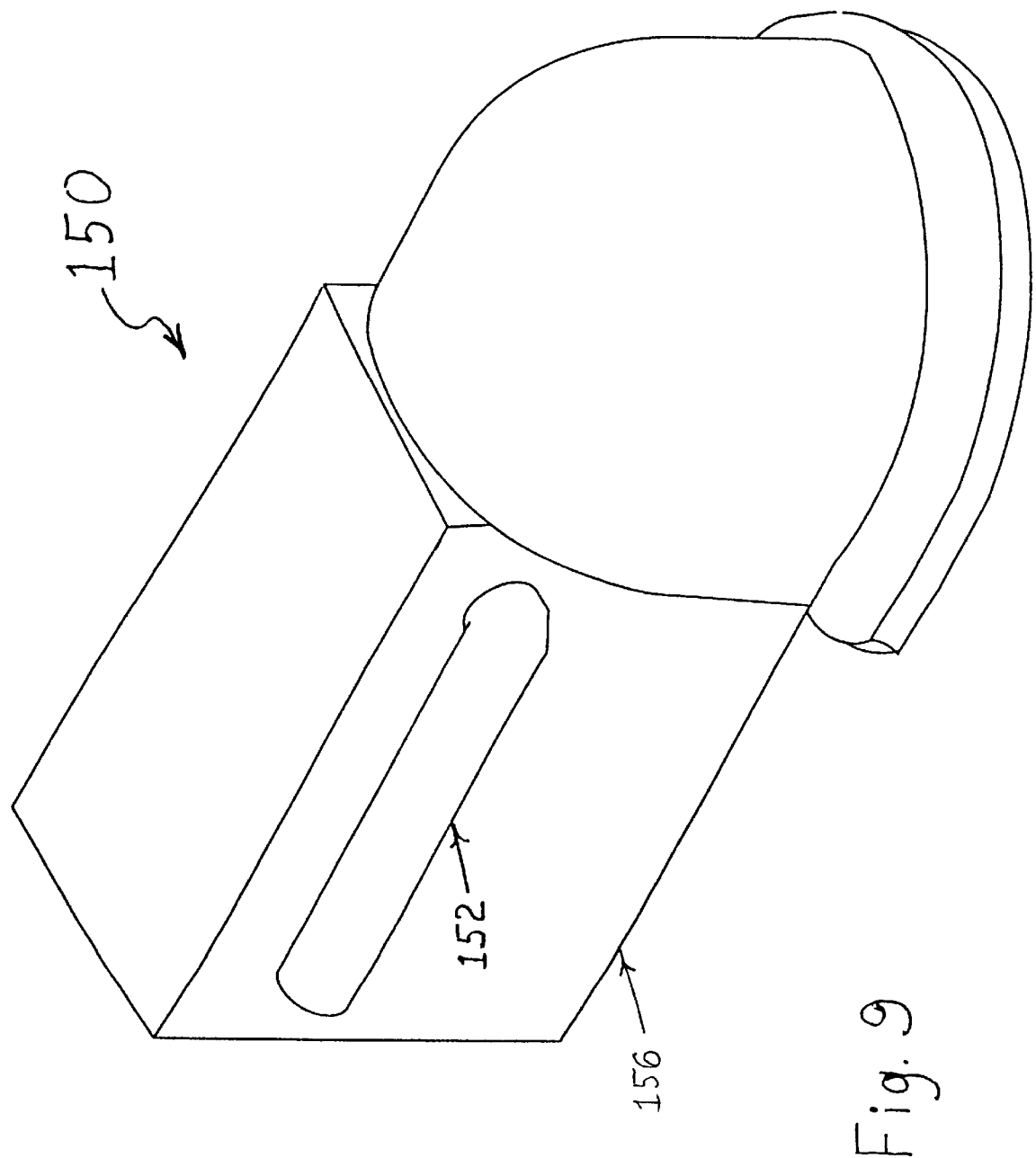
FIG. 9 is an oblique view of an embodiment of the device.
Figure 10:
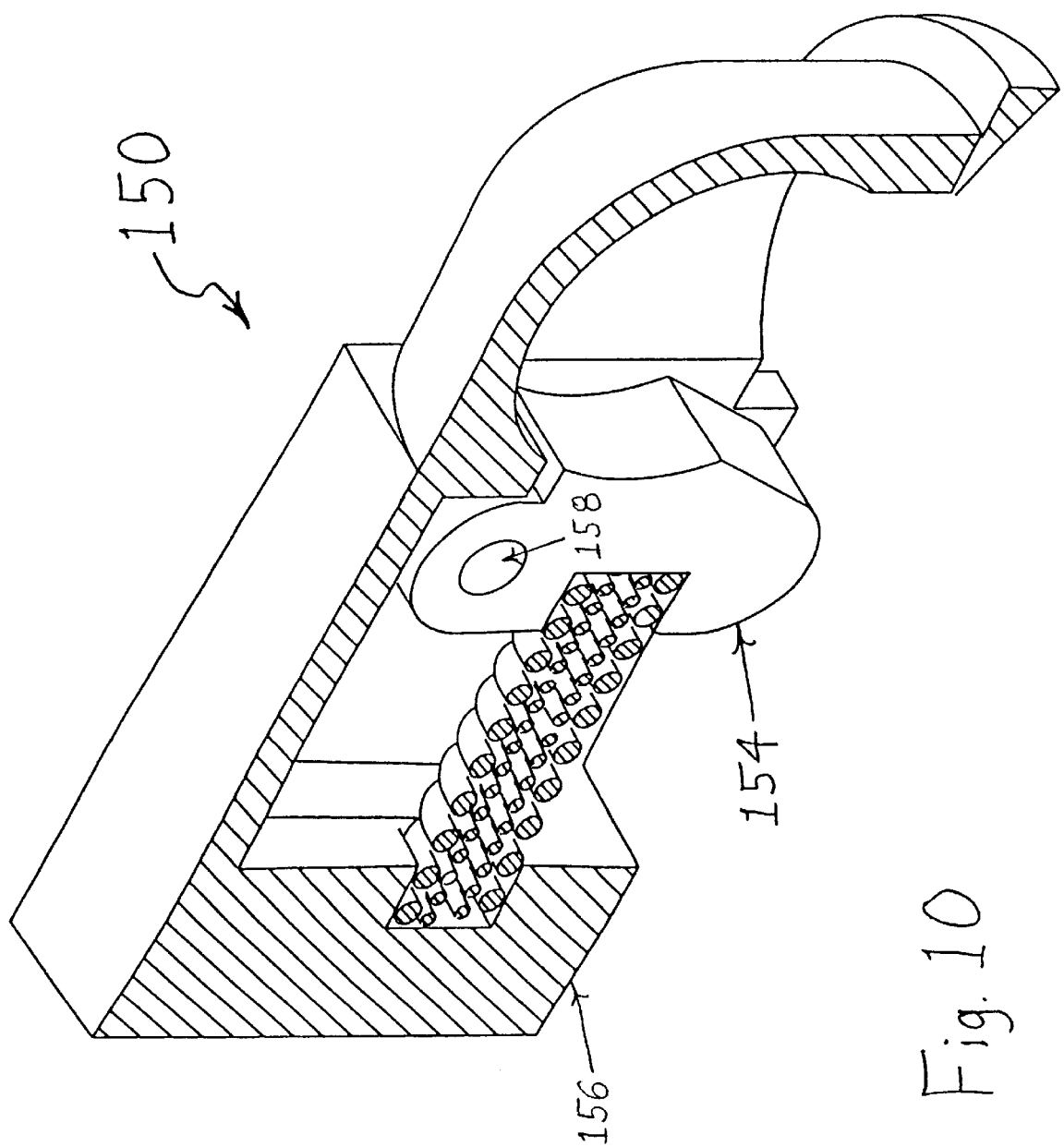
FIG. 10 is an oblique view of an embodiment of the device, cut along cutting plane 10—10.

FIGS. 9–10 depict an embodiment 150 of the invention wherein the handle 152 is attached to the pivoting ball support 154 in such a manner that it is moved in an upward, clockwise direction in order to move the pivoting ball support 154 from its first position to its second position.

Figure 11:
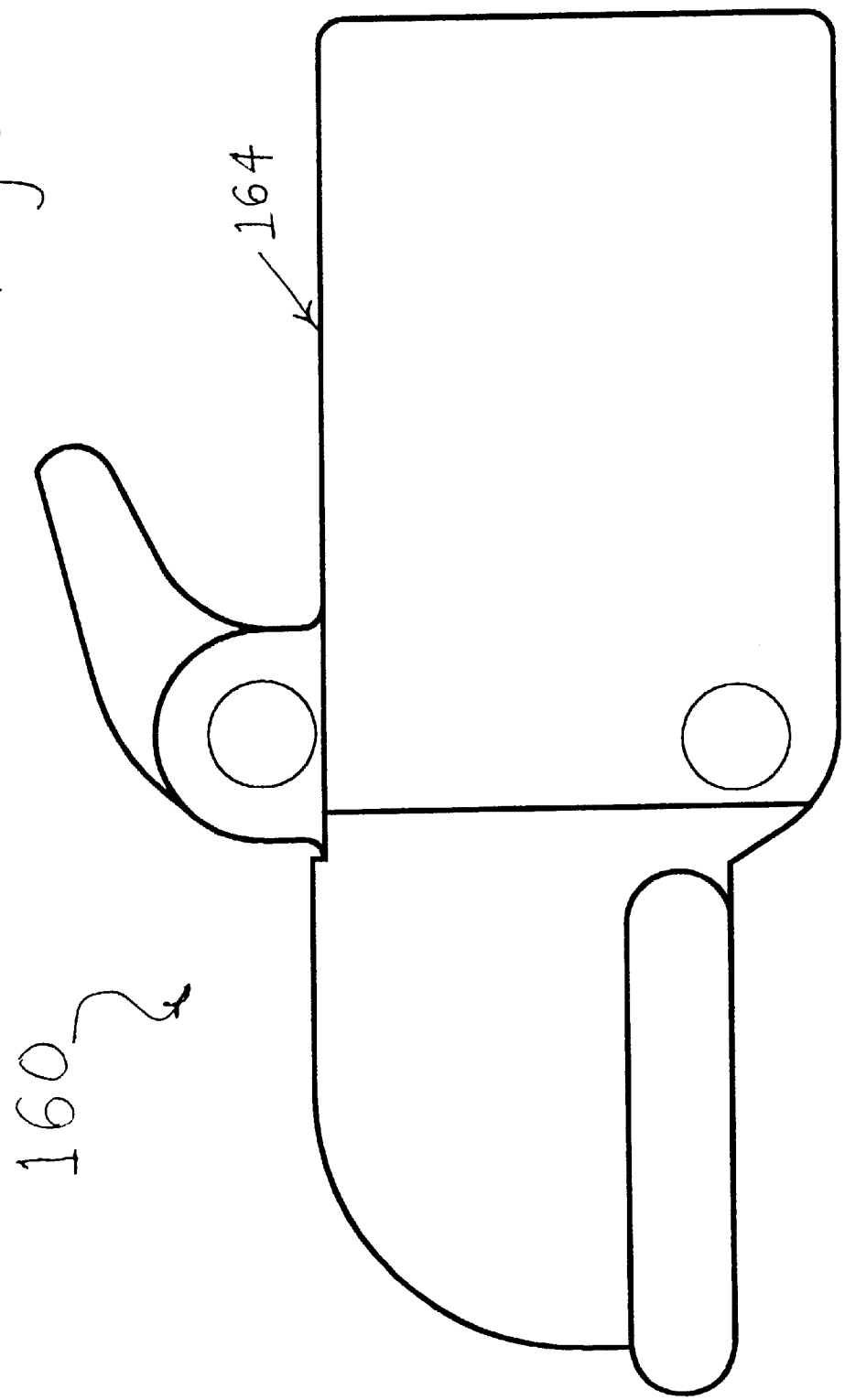
FIG. 11 is a side view of an embodiment of the device.
Figure 12:
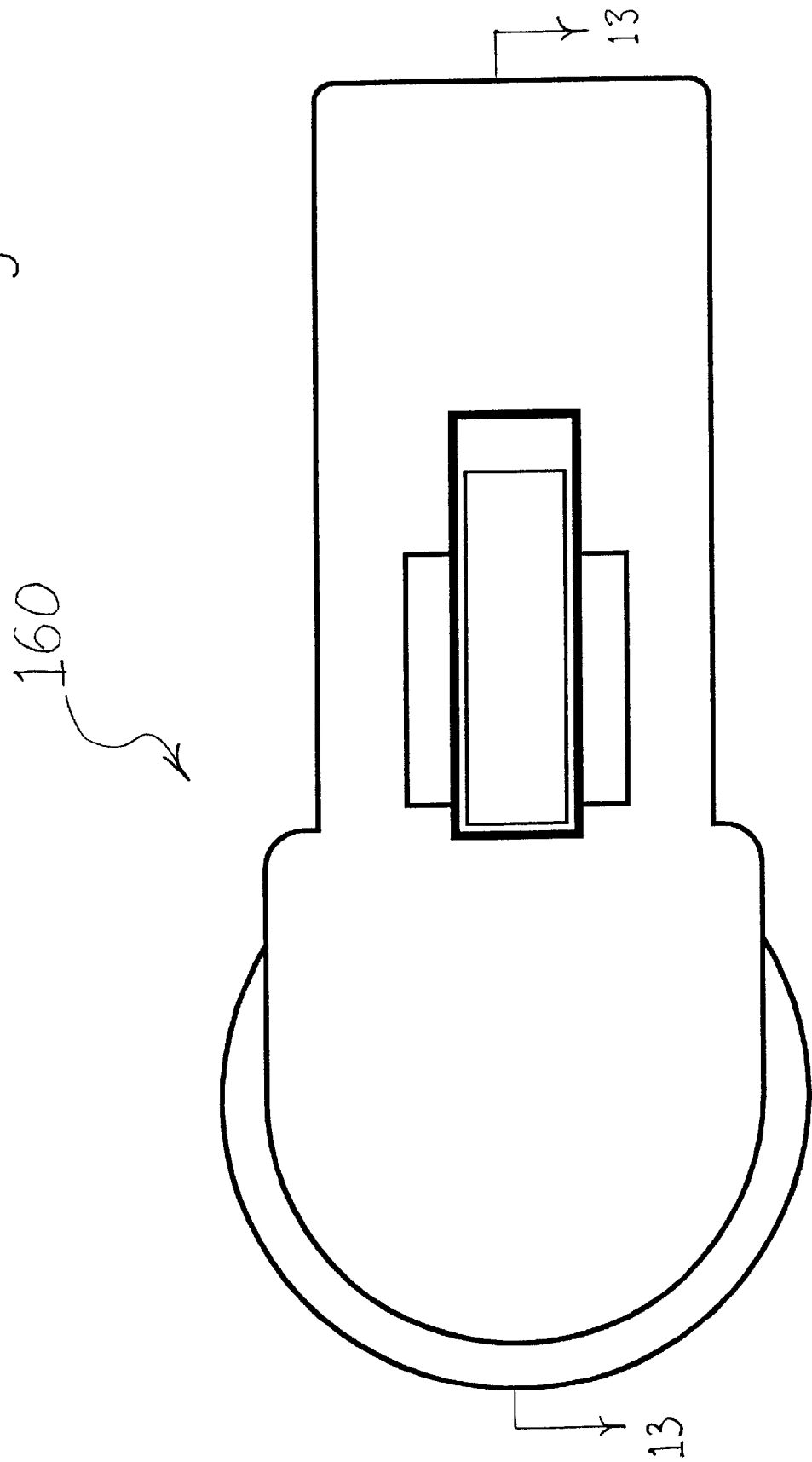
FIG. 12 is a top view of the embodiment shown in FIG. 11.
Figure 13:
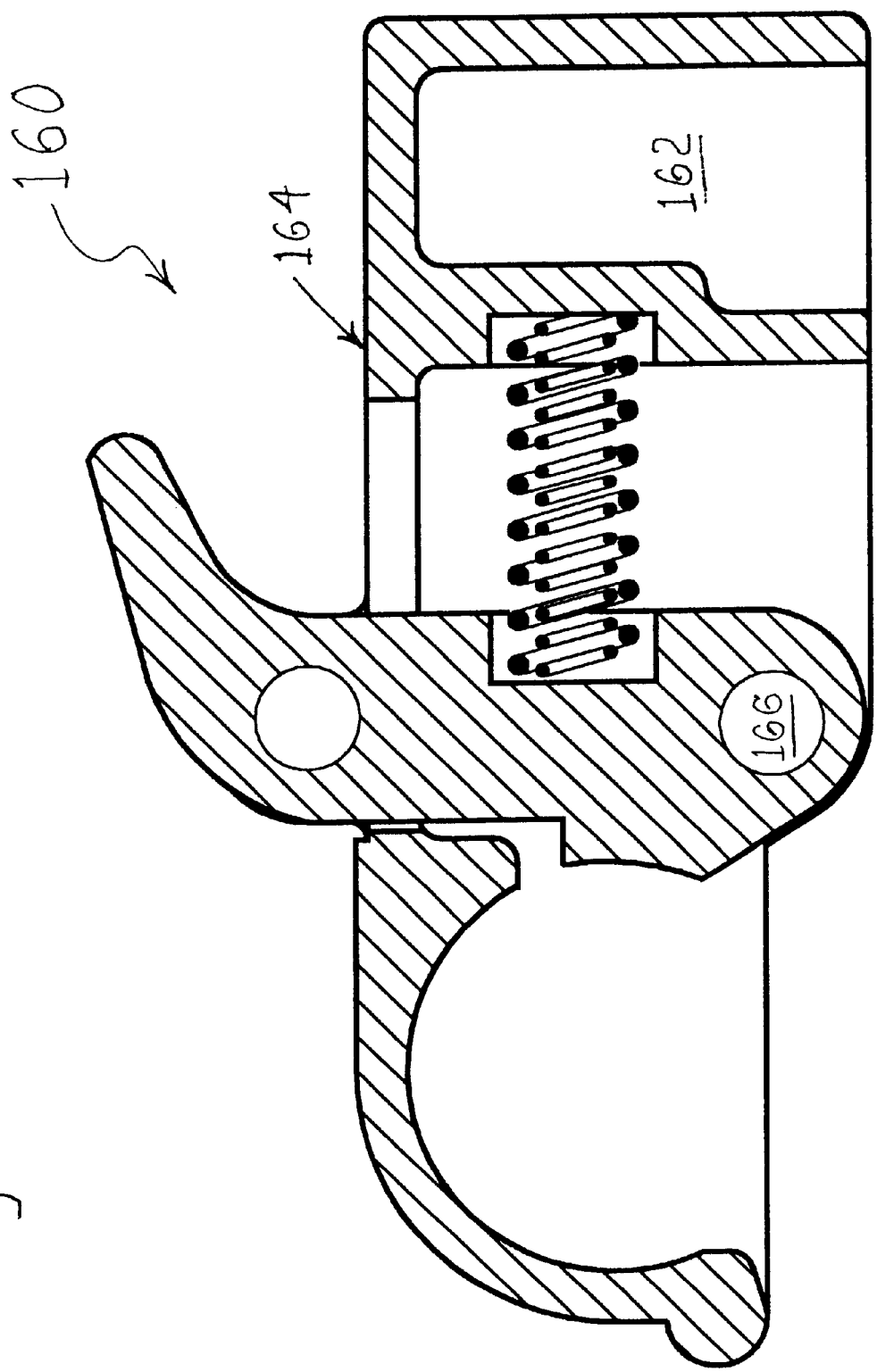
FIG. 13 is a side view of an embodiment of the device shown in FIG. 12, cut along cutting plane 13—13 depicting the latching mechanism in the closed position.

FIGS. 11–13 depict an additional embodiment of the hitch 160, which has been re-configured in some respects, from the embodiments of FIGS. 1–10. Furthermore, a cavity 162 is present in the frame 164, which reduces the weight. This embodiment of the hitch 160 appears to have the optimum configuration based on my current experience, although other adjustments to such configurations may occur to those of skill in the art after review of this disclosure.

Figure 14:
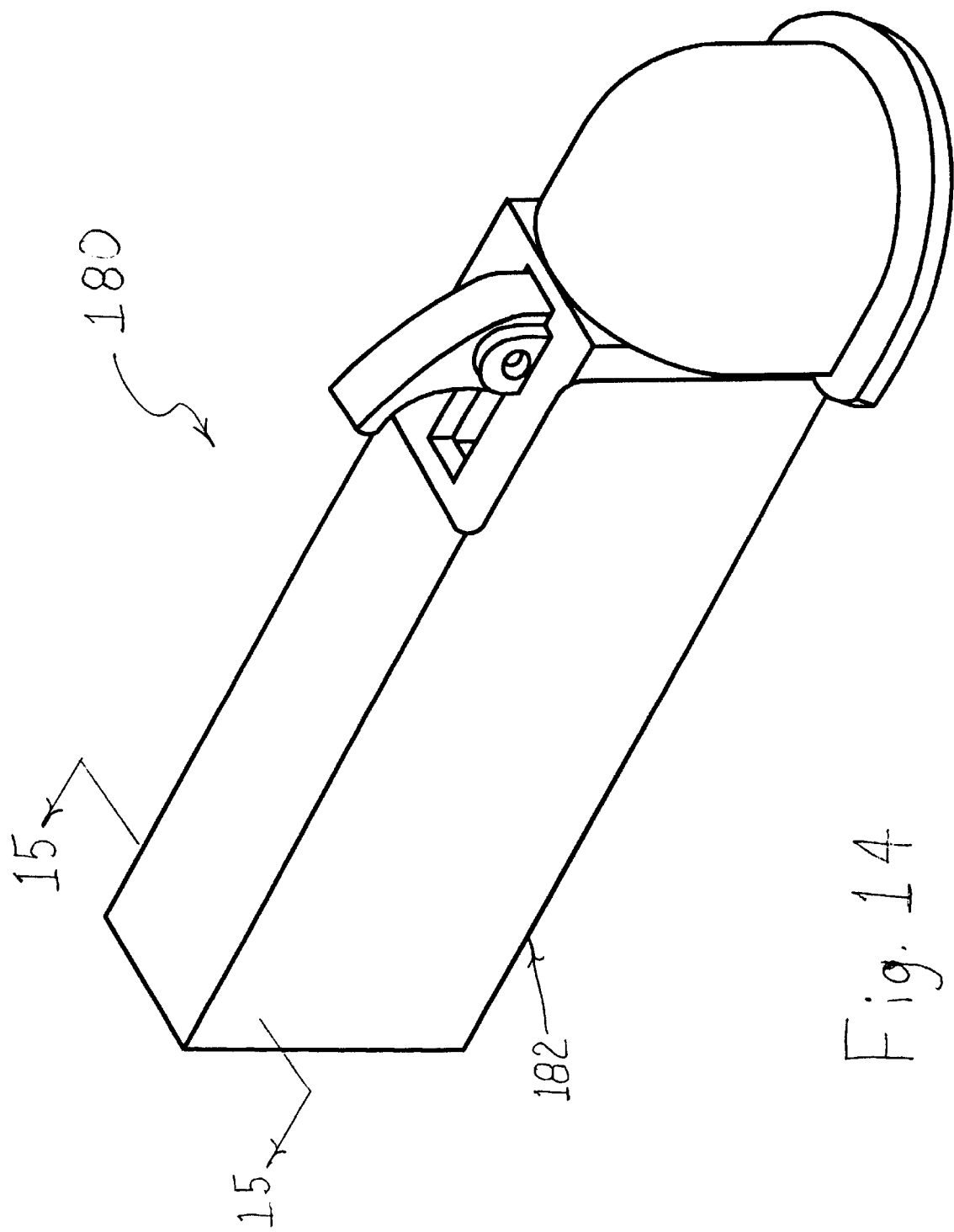
FIG. 14 is an oblique view of an embodiment of the device.
Figure 15:
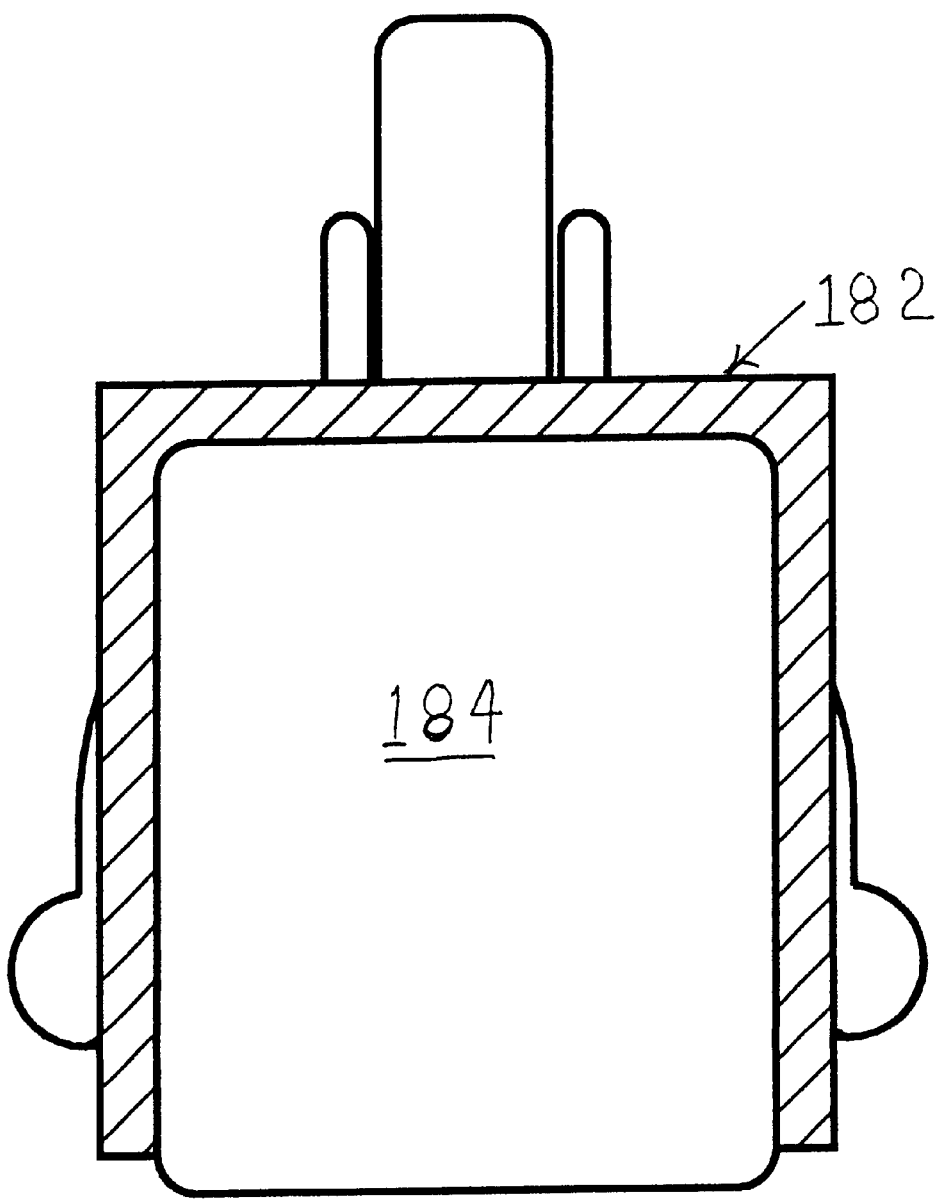
FIG. 15 is a rear view of the embodiment shown in FIG. 14, cut along cutting plane 15—15.

FIG. 14 depicts an embodiment 180 which includes the addition of channel structure 182. The channel structure 182 attaches, or is adaptable for attachment, to the frame 14,121, 156,164 of the embodiments shown in FIGS. 1–4 and 6–13. The channel structure 182 extends rearwardly, and as shown in FIG. 15, has a rearwardly facing channel-shaped opening 184 sized to closely receive rectangular structure, e.g., square tubing (not shown) extending from the trailer. The square tubing or other rectangular structure may be welded or otherwise attached to the channel structure 182. The channel structure 182 can be positioned with respect to the frame 14,121,156,164 such that the pivoting ball support pivot point 42,131,158,166 can be secured within the frame 14,121,156,164 in those embodiments wherein the pivoting ball support pivot point 42,131,158,160 extends, or can be extended, through the frame 14,121,156,164 such as those embodiments in FIGS. 1–4 and 6–13.

Figure 16:
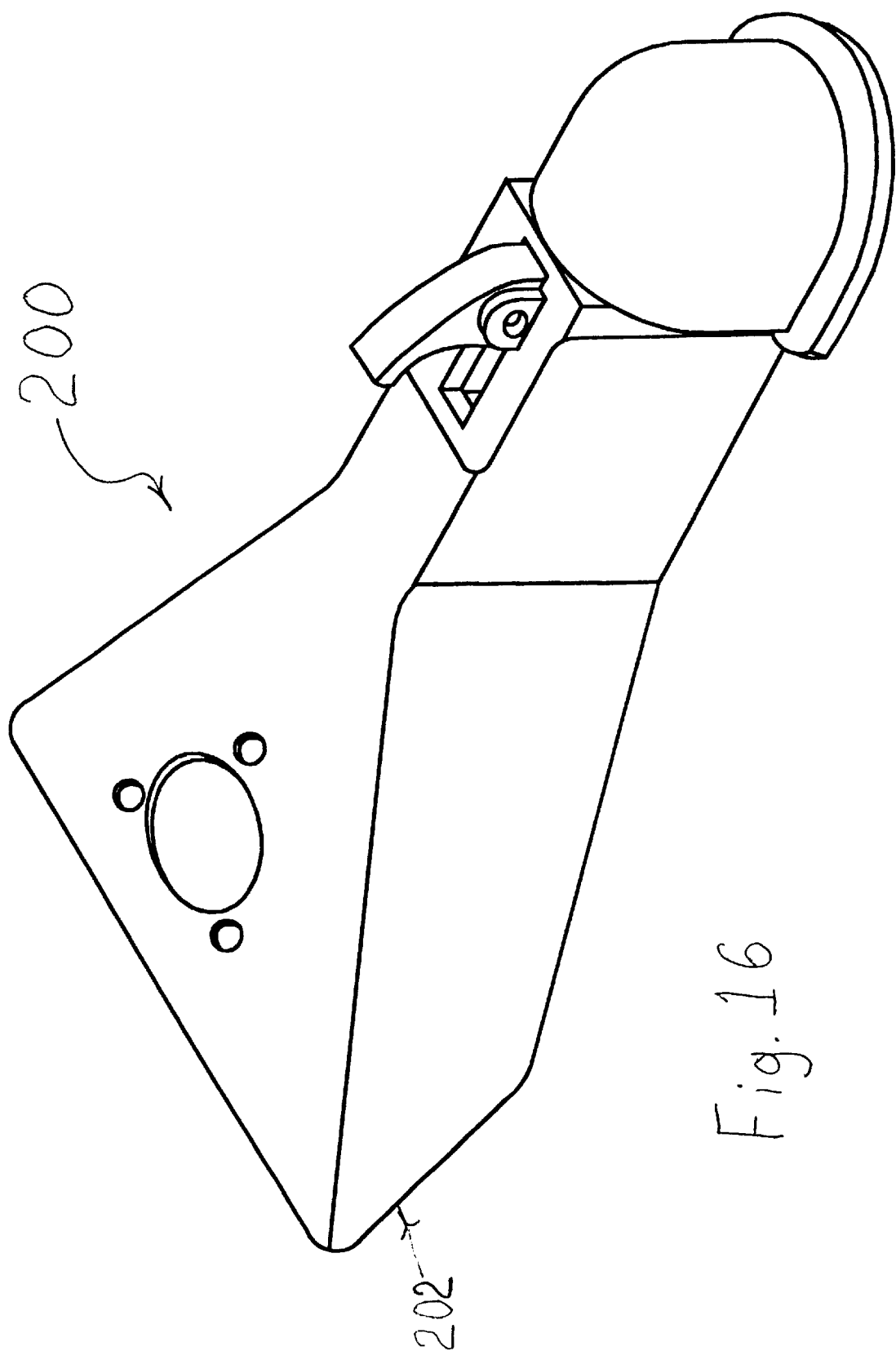
FIG. 16 is an oblique view of an embodiment of the device.
Figure 17:
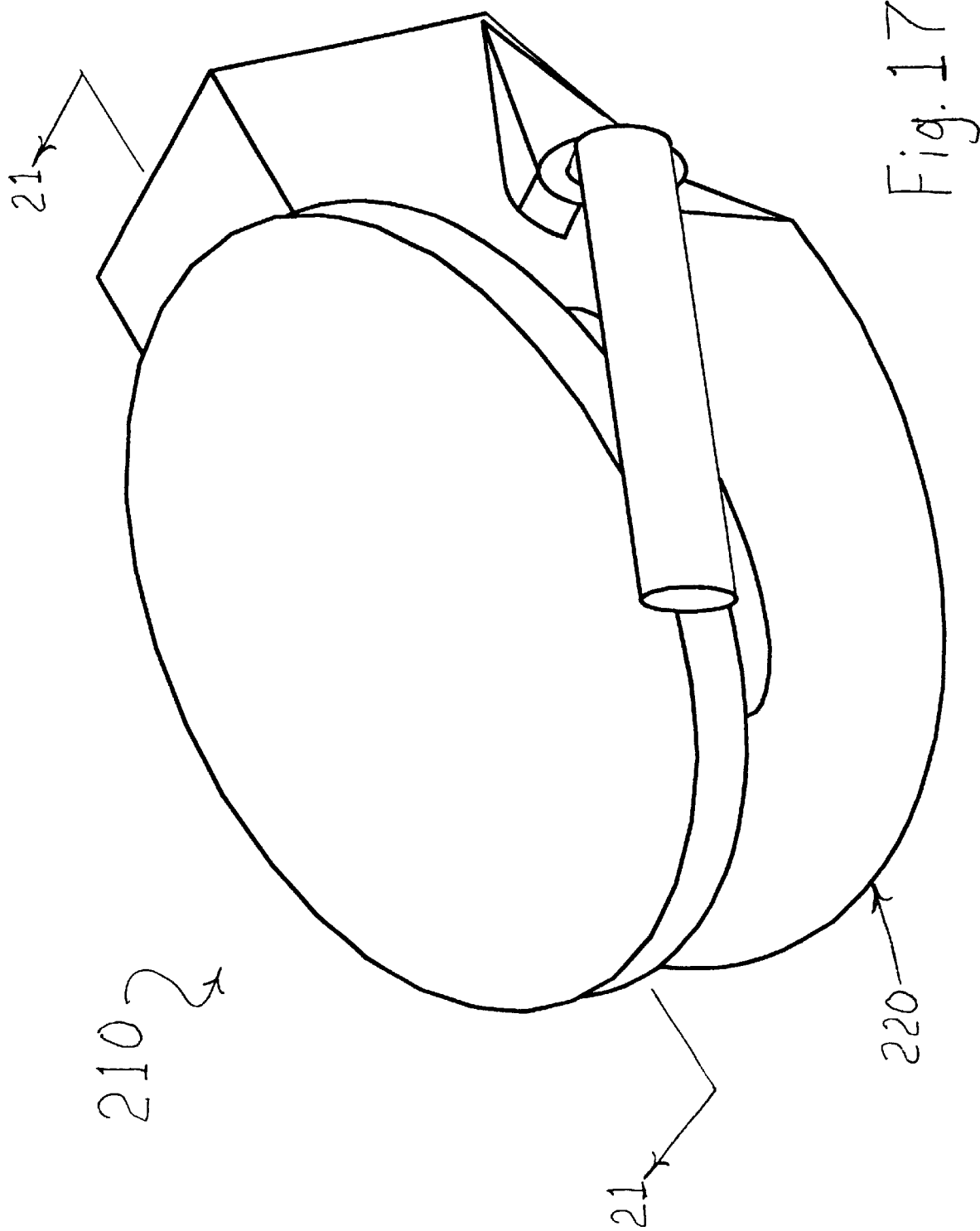
FIG. 17 is an oblique view of an embodiment of the device showing a gooseneck adaptation.
Figure 18:
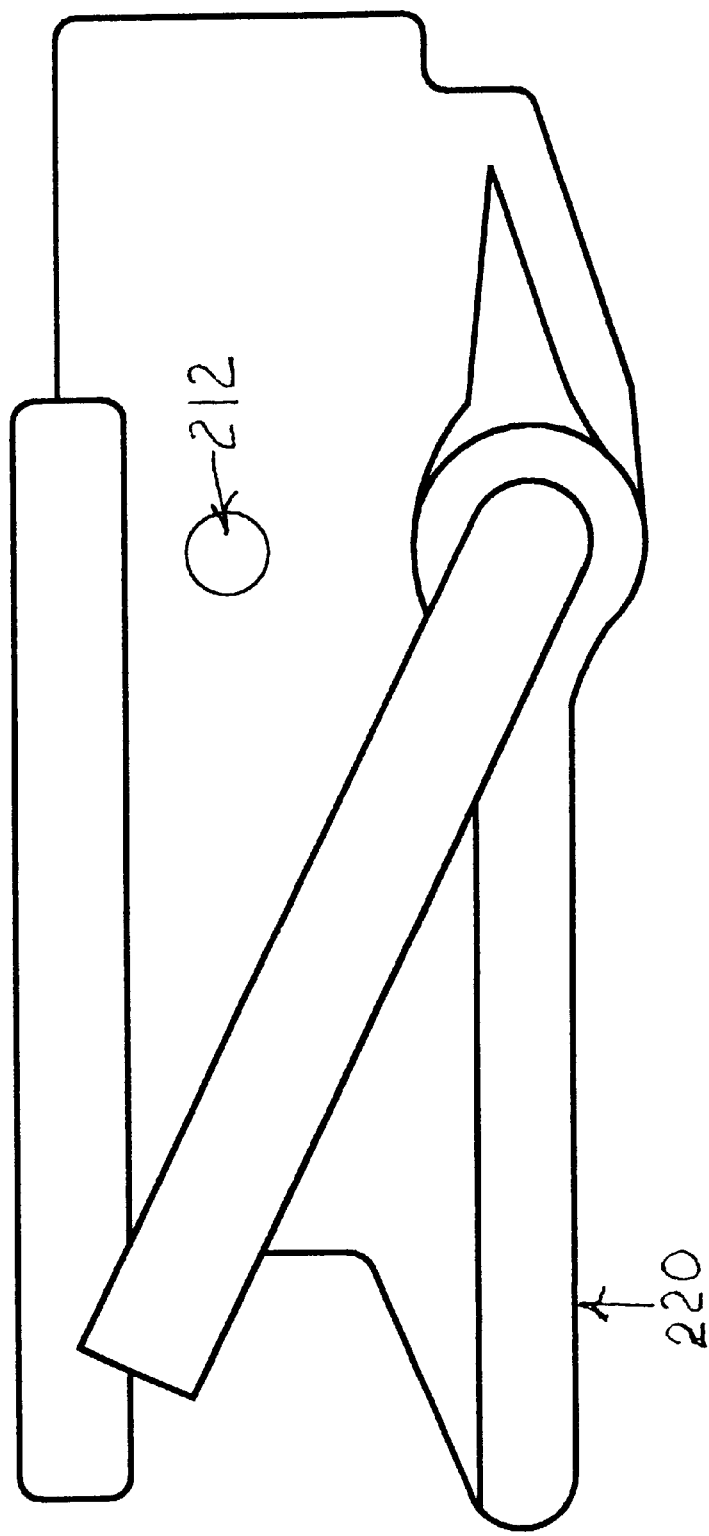
FIG. 18 is a side view of the embodiment shown in FIG. 18.
Figure 19:
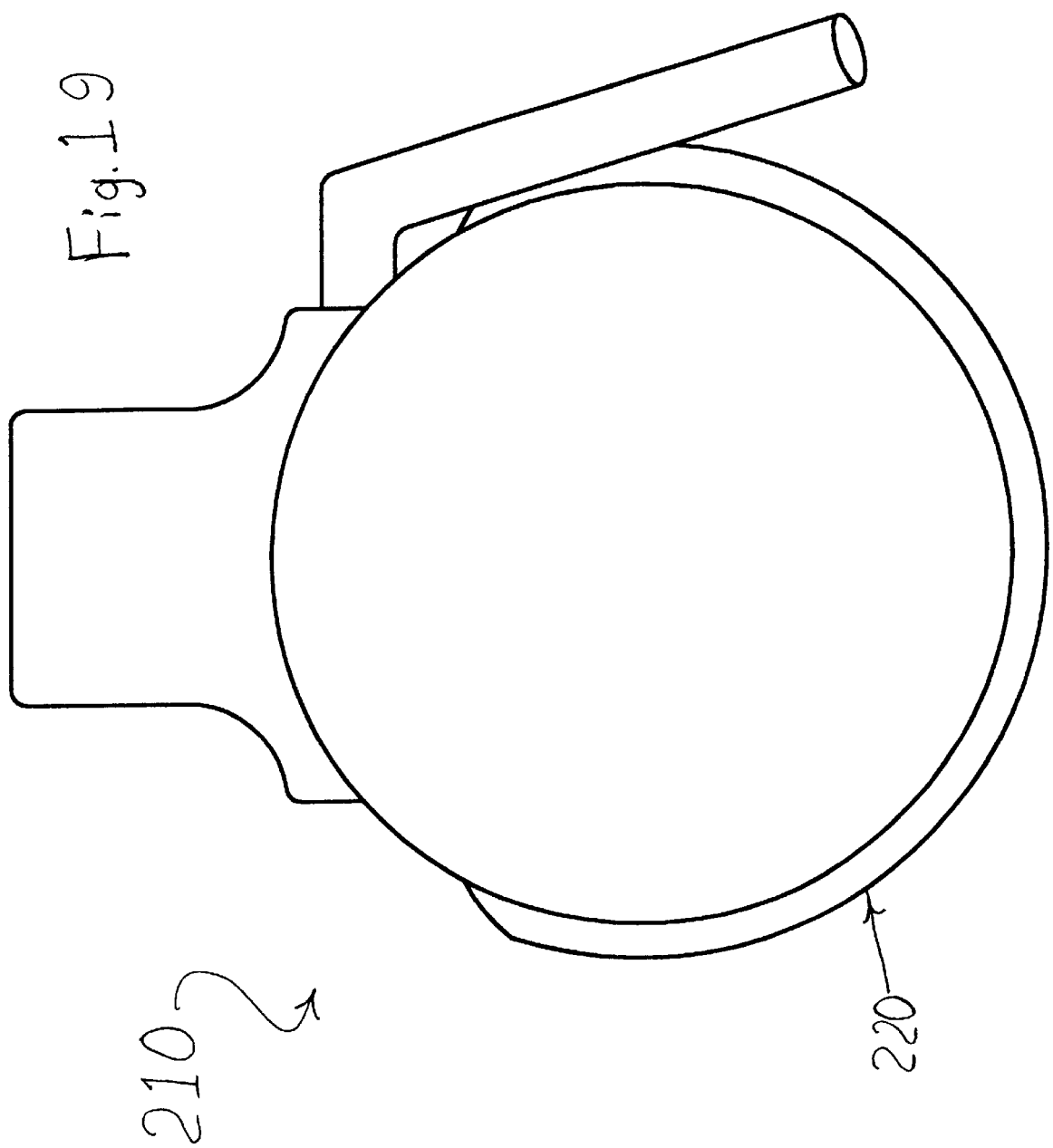
FIG. 19 is a top view of the embodiment shown in FIG. 17.
Figure 20:
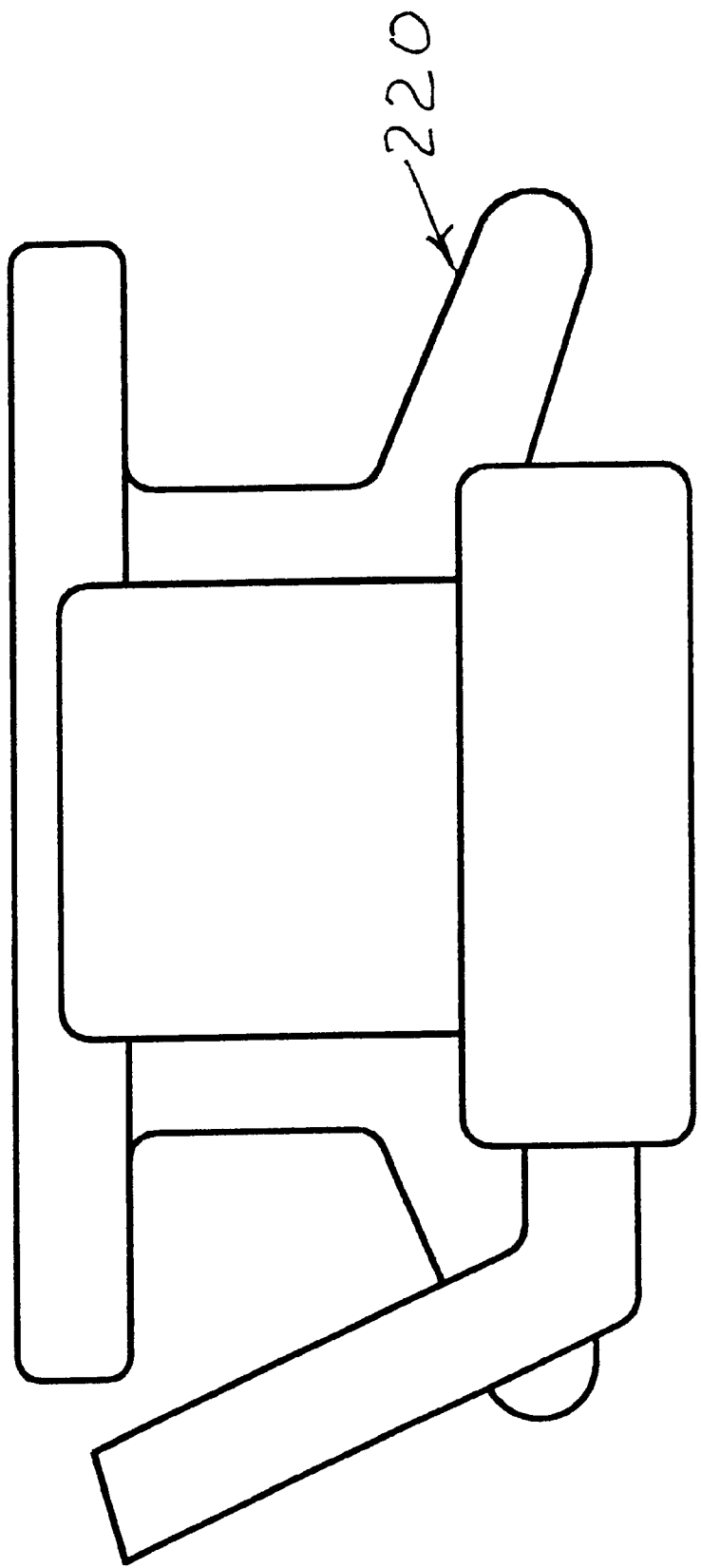
FIG. 20 is a rear view of the embodiment shown in FIG. 17.

Similarly, FIG. 16, depicts an embodiment 200 which includes an A-frame structure 202. The A-frame structure 202 attaches, or is adaptable for attachment, to the frame 42,131,158,160 and extends rearwardly to closely receive trailer tongue structure (not shown). Other structures for joining my device to particular trailer structures will occur to those of skill in the art upon review of this disclosure.

Figure 21:
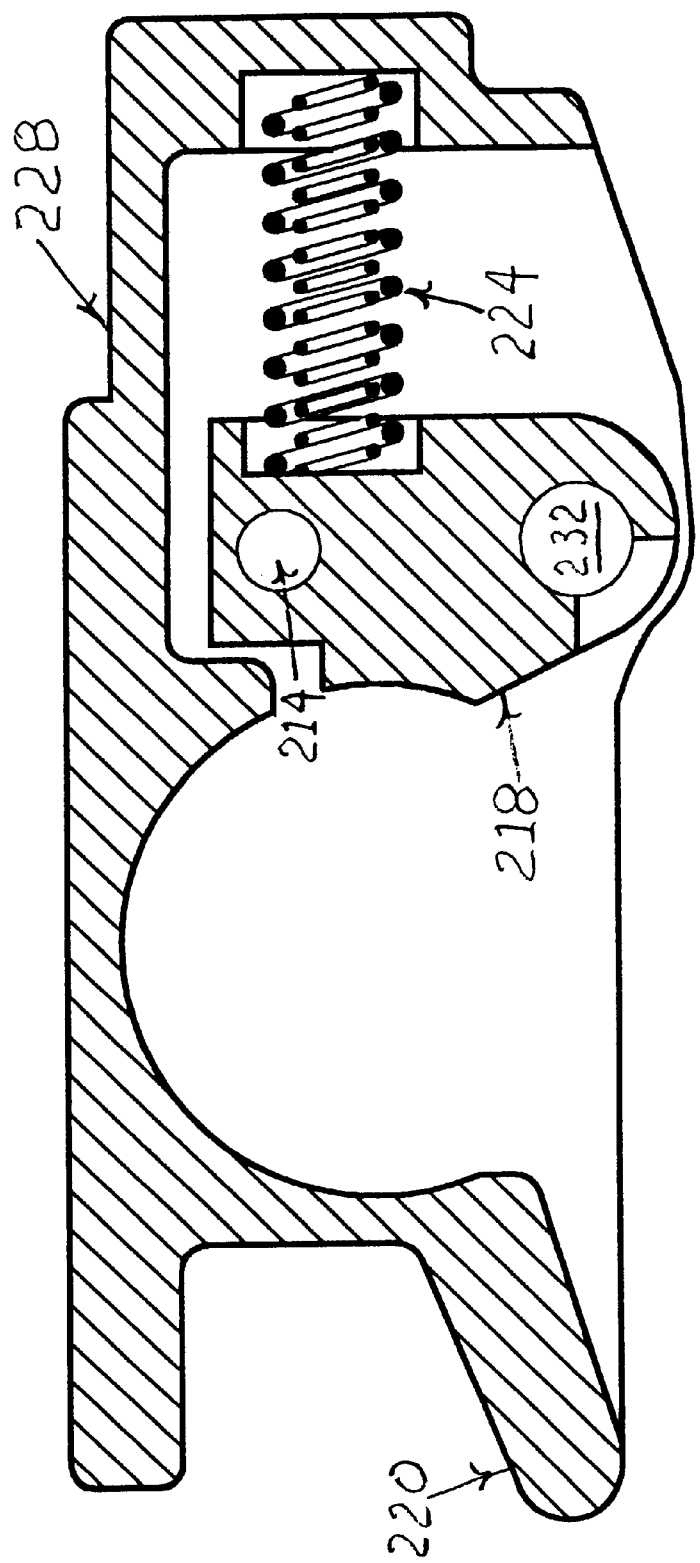
FIG. 21 is a side view of the embodiment of the device shown in FIG. 17, cut along cutting plane 21—21.

FIGS. 17–23 depict additional "gooseneck" embodiments 210 and 240. Although similar to FIG. 5, these embodiments include holes 212,214 in the frame 216 and pivoting ball support 218 which are aligned and sized for closely receiving a pin (not shown). An exterior frame lip 220, is also included. FIGS. 22–23 also depict vertical pipe structure 222, which is included for the purposes described with regard to FIG. 5, above. The springs 224 shown in FIG. 21 are excluded from FIG. 23 such that a pivoting ball support stop 226 is revealed, which extends from one or both sides of the frame 228. The extension is such that the pivoting ball support 218 rotation is halted by contact between the pivoting ball support 218 and one or more of the pivoting ball support stops 226. A weld access opening 230 is originally present in the pivoting ball support 218 to allow the pivoting ball support 218 to be welded to the pivoting ball support pivot point 232. It is anticipated that all, or substantially all of such welding access hole 230 will be filled by weld material.

Figure 23A:
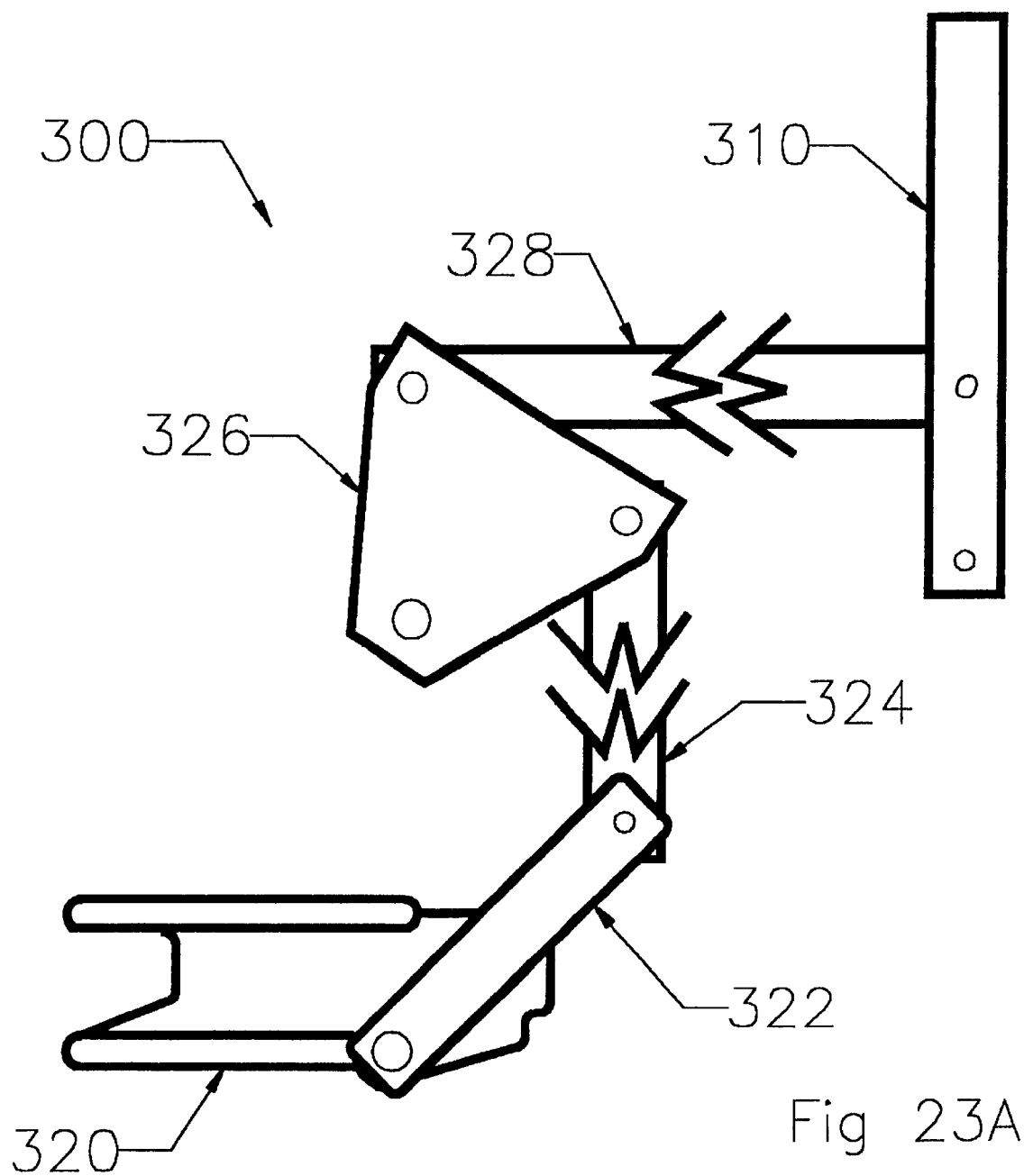
FIG. 23A is a side view of the remote access handle embodiment, with the longer members shown in cutaway form.
Figure 23B:
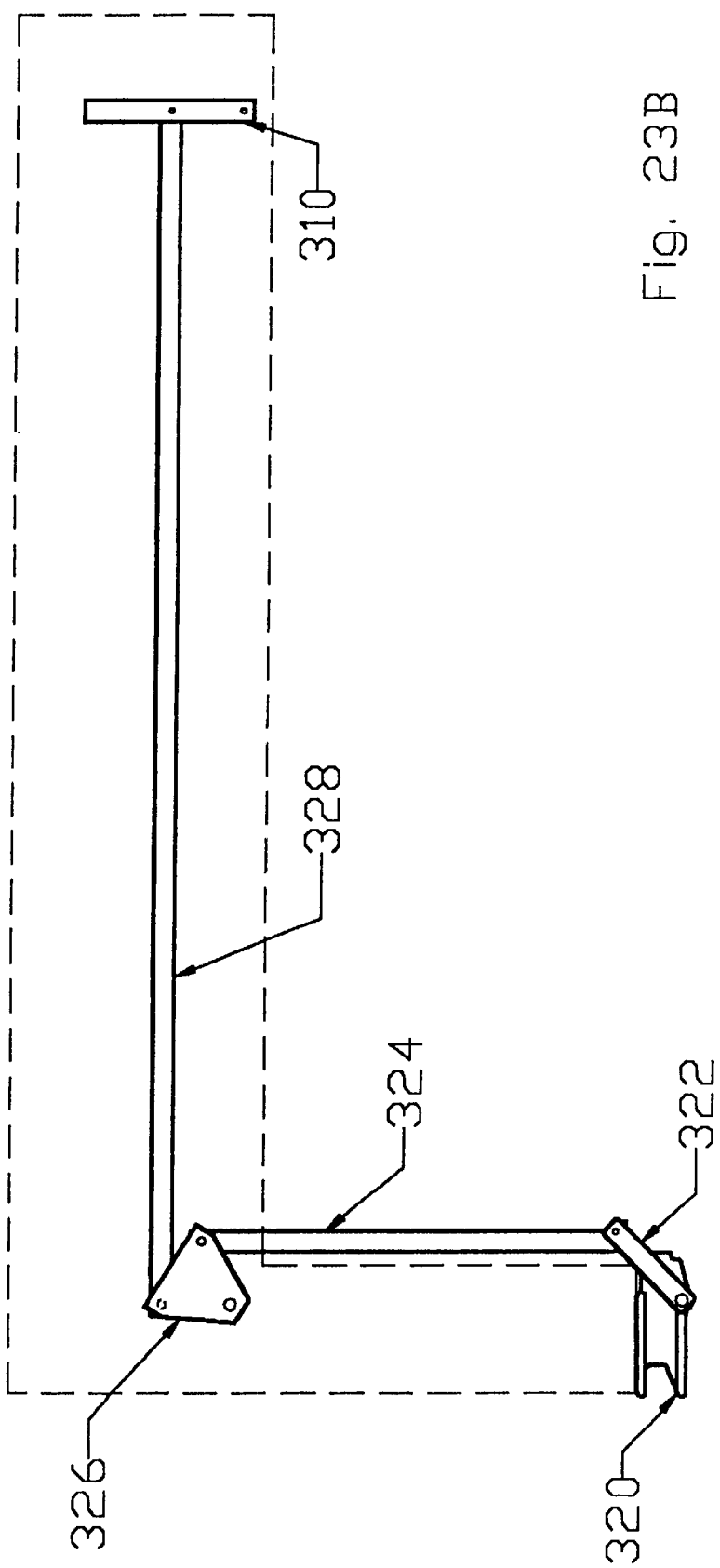
FIG. 23B is a side view of the remote access handle embodiment shown in its attached position on the gooseneck trailer structure.
Figure 24:
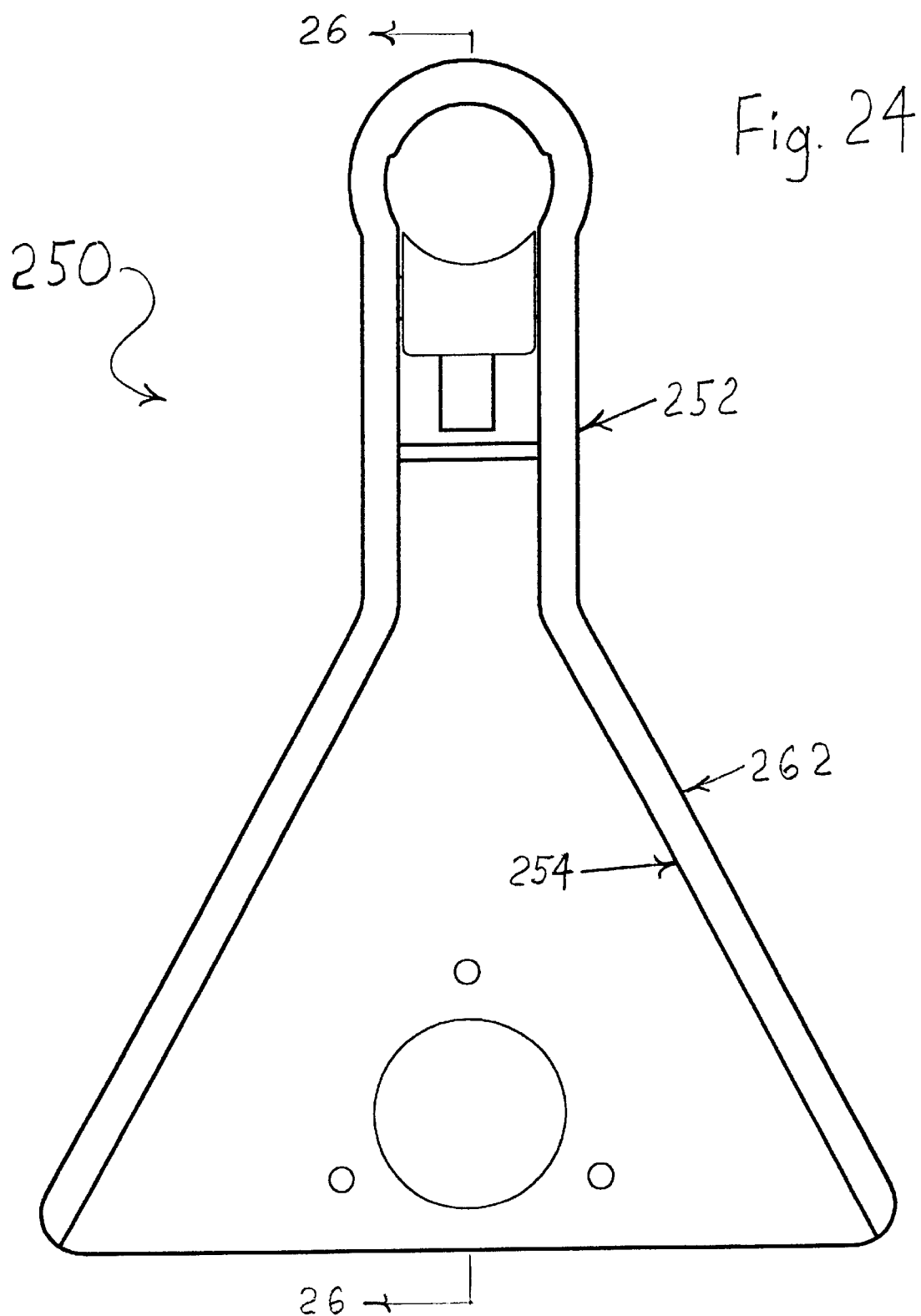
FIG. 24 is a bottom view of an embodiment of the device.
Figure 25:
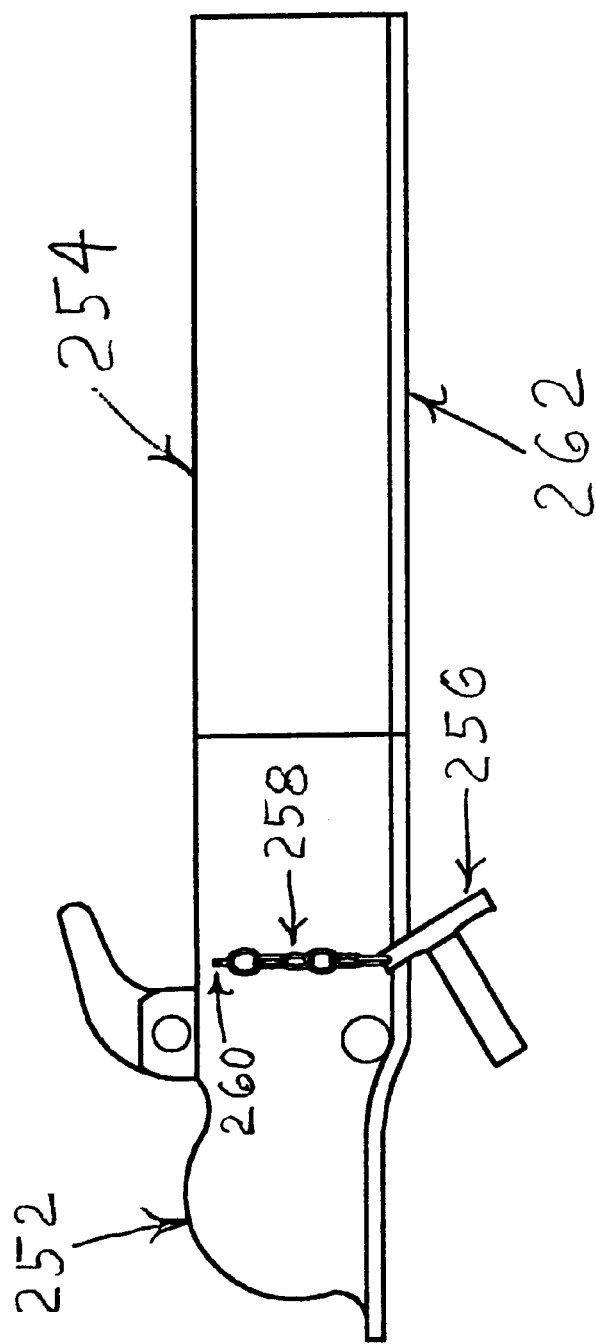
FIG. 25 is a side view of the device shown in FIG. 24.
Figure 26:
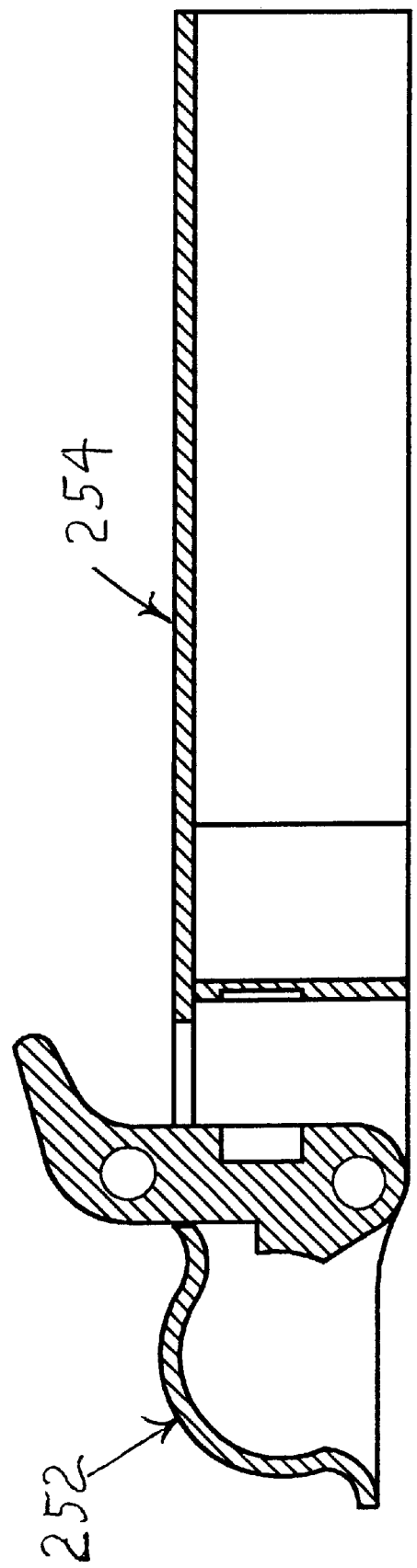
FIG. 26 is a side view of the embodiment shown in FIG. 24, cut along cutting plane 26—26, depicting the latching mechanism in the closed position.
Figure 27:
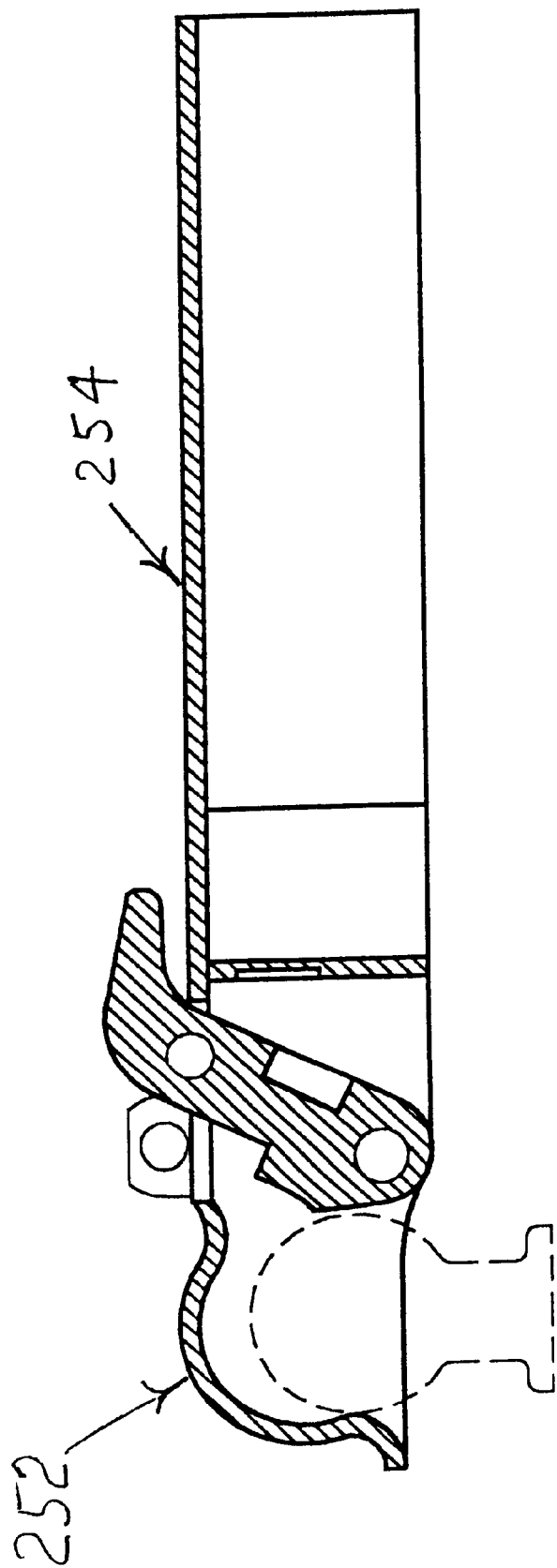
FIG. 27 is a side view of the embodiment shown in FIG. 24, cut along cutting plane 26—26, depicting the latching mechanism in the open position.

FIGS. 23A and 23B depict an additional embodiment 300 in which a handle 310 is made accessible at a distance from the hitch 320 through the hinged connection of a first member 322, a second member 324, a third member 326, and a fourth member 328. The third member 326 is hinged to the gooseneck trailer structure, and the handle 310 can, if desired, be hinged to the gooseneck structure as well. The handle 310 and four members 322,324,326,328 are constructed from flat mild steel, although other grades and shapes of steel may be utilized, as well as, one or more plastics. Flat, round, and hollow members 322,324,326,328 may also be utilized.

FIG. 23C depicts an additional embodiment 330 in which a handle 332 is made accessible at a distance from the hitch 334 through the hinged connection of a first member 336, a second member 338, a third member 340, a fourth member 342, a fifth member 344, and a sixth member 346. The third member 340 and the fifth member 344 are hinged to the gooseneck trailer structure, and the handle 332 can, if desired, be hinged to the gooseneck structure as well.

FIGS. 24–27 depict an additional embodiment 250 in which the frame 252 and the A-frame structure 254 are fashioned from pressed or stamped steel in a one-piece configuration. This configuration and manufacturing method will allow a simpler attachment of structures such as the A-frame structure 254 shown, and other structures for special trailer attachment requirements, such as the channel structure 182 shown in FIGS. 14-15. Such other structures, and the re-configurations of the hitch necessary to support this manufacturing method will occur to those skilled in the art upon review of this disclosure and as various trailer structures are presented for attachment. A pin 256, pin chain 258, and pin chain attachment point 260 are depicted on FIG. 25. This configuration and manufacturing method also includes a structural lip 262 extending along the frame 252 and A-frame structure 254. For clarity the spring(s) are not shown in FIGS. 24, 26–27.

Figure 28:
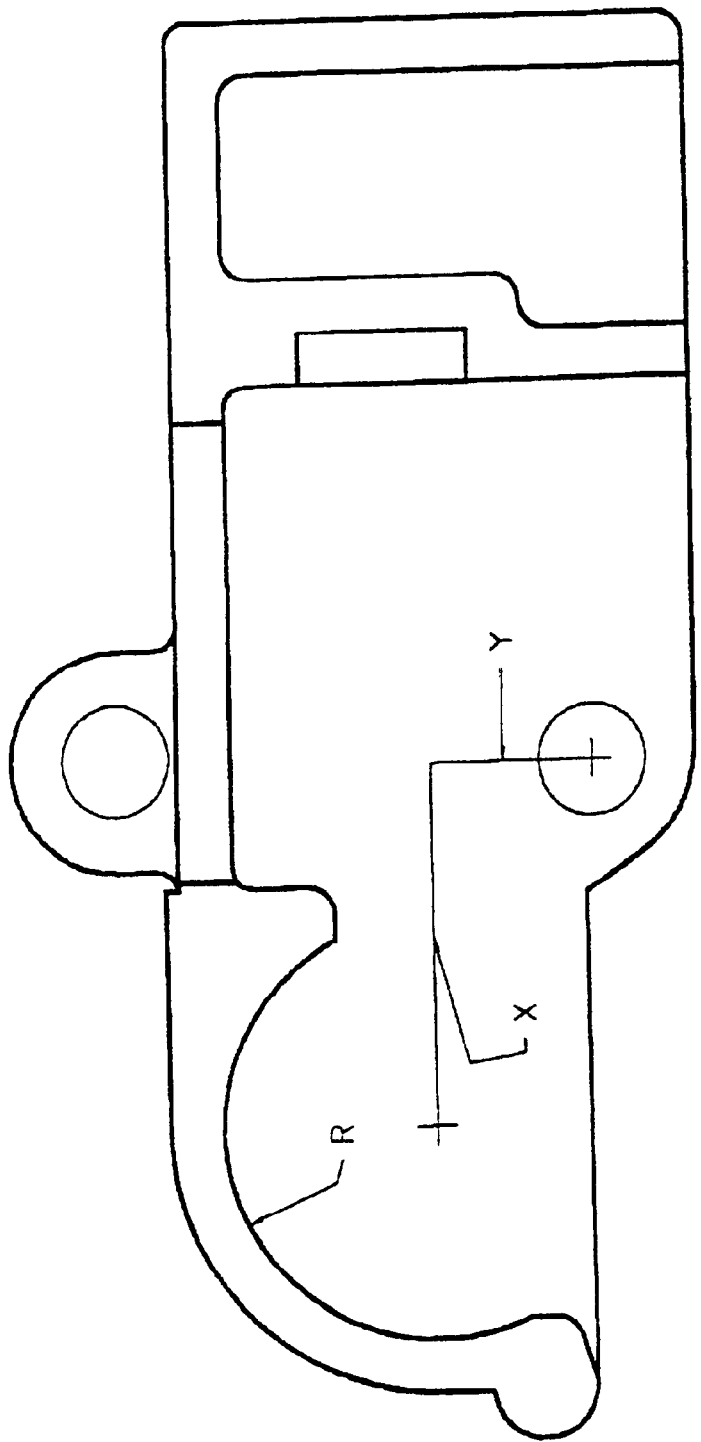
FIG. 28 is a side view cutaway depicting a typical embodiment which further illustrates the relationship between R, X, and Y which is believed to provide functionally satisfactory results for all embodiments of my invention, including embodiments utilized to secure balls of varying sizes. R is the radius of the ball housing, i.e., that portion of the frame front interior section which most closely receives the ball. The distances Y and X identify the position for the center of rotation of the pivoting ball support pivot point.

FIG. 28 depicts a typical embodiment 270 and further illustrates the relationship between R, X, and Y which is believed to provide functionally satisfactory results for all embodiments of my invention, including embodiments utilized to secure balls of varying sizes. R is the radius of the ball housing, i.e., that portion of the frame front interior section 272 which most closely receives the ball. The distances Y and X identify the position for the center of rotation of the pivoting ball support pivot point 274. As my invention is utilized in various embodiments, the identification of permissible tolerances in the relationship between R, X, and Y will occur to those of skill in the art after review of this disclosure.

Figure 29:
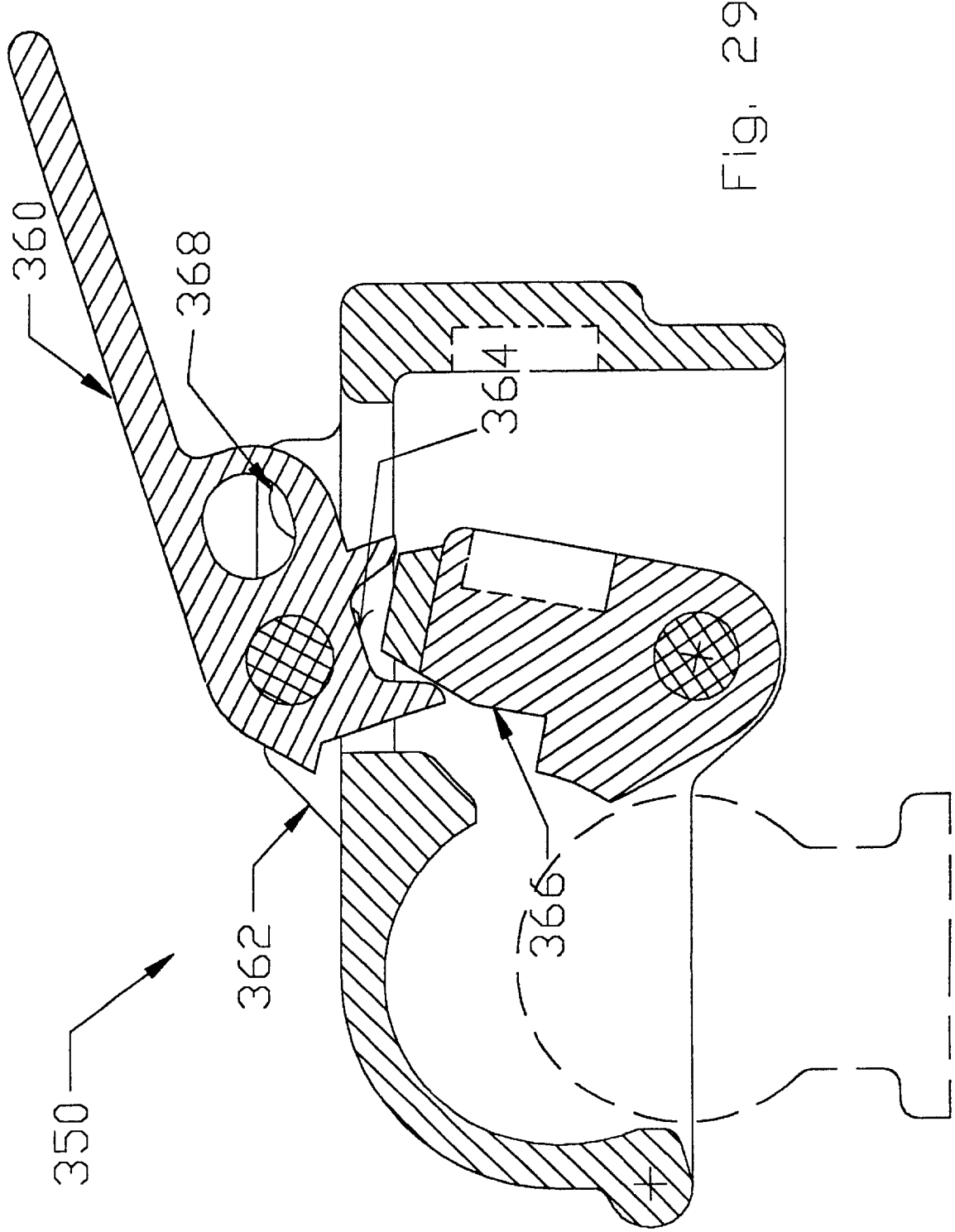
FIG. 29 is a cutaway side view of an embodiment depicting a handle, which is attached to the frame, with the handle raised, and the hitch in its open position.
Figure 30:
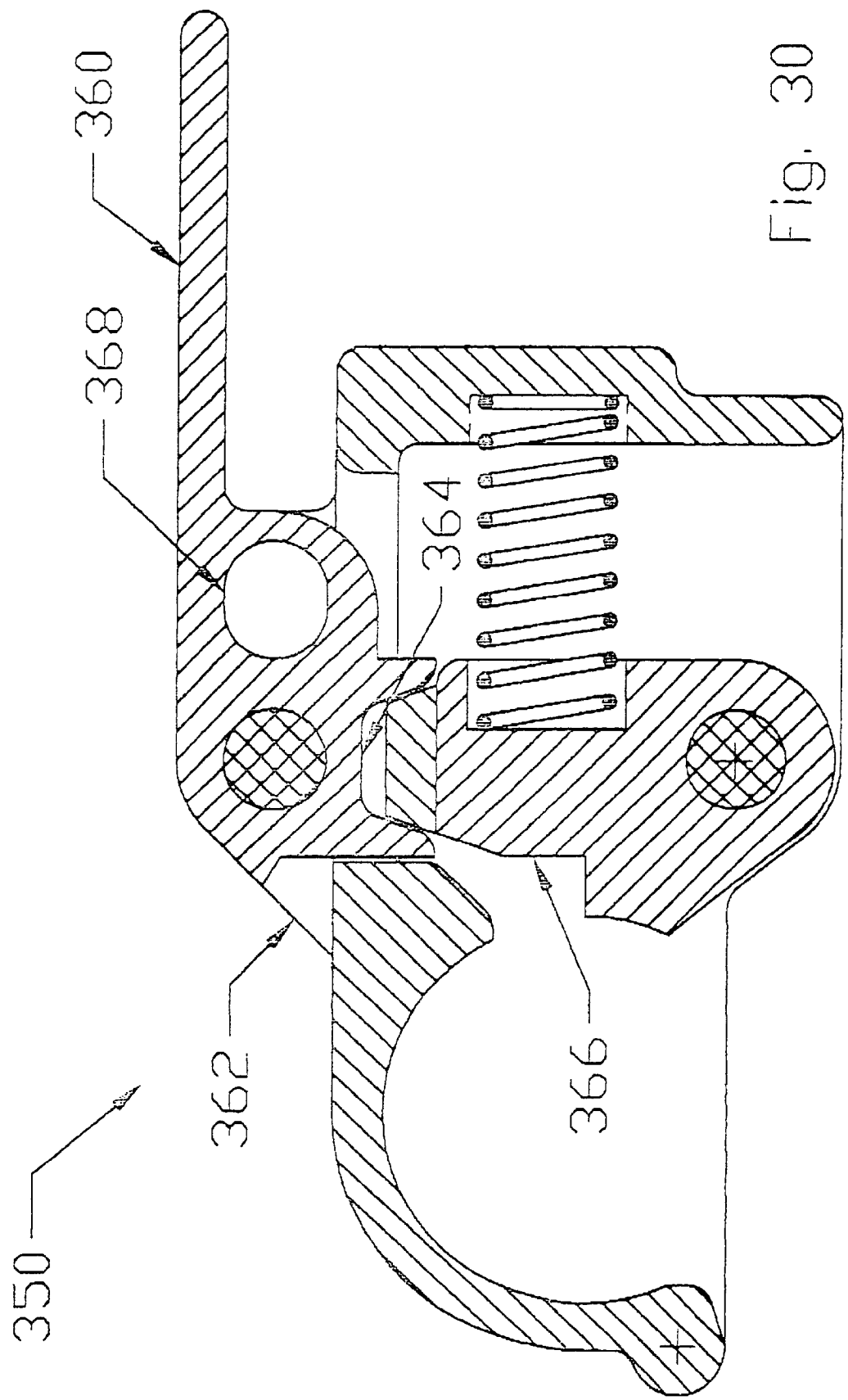
FIG. 30 is a cutaway side view of the embodiment shown in FIG. 29, the hitch being in its closed position.

FIGS. 29 and 30 depict an additional embodiment 350 which has a handle 360 hinged to the frame 362 which has a recess 364 which closely receives the top of the pivoting ball support 366 when the pivoting ball support 366 is in its first position. The rotation of the handle 360 moves the pivoting ball support 366 to its second position, as shown in FIG. 30. A hole 368 in the handle 360 is also provided for purposes of inserting a pin (not shown) or a lock (not shown).

The simple and effective coupling and coupling release features of my invention will be used for many applications other than trailer hitches. For example, embodiments of varying sizes are included for providing gate and door latch functions. Other embodiments are included wherein my invention can be sized and configured as necessary for the most efficient coupling performance, including, recessed and/or integrated positioning of the invention within the structure to be coupled, as well as, vertical, upside down, angled and sideways installations. Embodiments are included wherein the structure to which the ball is attached is not aligned with the structure to which my invention is attached. In other embodiments the structure to which the ball is attached does not lie in the same plane as the frame on my invention. Also included are applications in which my invention will include the ball and/or the attachment structure to secure the ball to the portion of structure to be coupled. A wide variety of materials may be used for the components in any embodiment of my invention, particularly those embodiments used to couple lighter weight structures. Plastics, other metals, wood and other materials may be utilized. Other coupling applications will occur to those of skill in the art after review of this disclosure.

The features of many of the embodiments discussed above are interchangeable with other embodiments, and it is contemplated that additional embodiments will be practiced using various combinations of such features.

Although the present invention has been described in considerable detail with reference to certain embodiments thereof, other embodiments are possible. The illustrated or described embodiments are given by way of example only and other embodiments will occur to those of skill in the art without departing from the spirit of the invention. Accordingly, the spirit and scope of the claims should not be limited to the description of the embodiments contained herein.

I claim:

1. An apparatus for receiving and securing a ball, comprising:
 a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot;
 a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support pivot point and the pivoting ball support face being further configured with respect to the frame front interior section, such that the force exerted by the ball on the pivoting ball support face tends to rotate the pivoting ball support face about the pivoting ball support pivot point in a manner such that the pivoting ball support face stays in, or is moved toward, the first position, the pivoting ball support further having a top; and
 a rotation member comprising a handle, the handle being pivotally attached to the frame and extending partially through the frame slot, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

2. An apparatus for receiving and securing a ball, comprising:
 a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section, the frame further having a slot;
 a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening, the pivoting ball support further having a top;
 a spring, the spring having a first and second end, the spring's first end being positioned against the pivoting ball support, the spring's second end being positioned against the frame rear interior section interior surface, such that movement of the pivoting ball support face from its first position to its second position is resisted; and a rotation member comprising a handle, the handle being pivotally attached to the frame and extending partially through the frame slot, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

3. An apparatus for receiving and securing a hitch ball, comprising:

a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support pivot point and the pivoting ball support face being further configured with respect to the frame front interior section, such that the force exerted by the hitch ball on the pivoting ball support face tends to rotate the pivoting ball support face about the pivoting ball support pivot point in a manner such that the pivoting ball support face stays in, or is moved toward, the first position, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

4. An apparatus for receiving and securing a hitch ball, comprising:

a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section, the frame further having a slot;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening, the pivoting ball support further having a top;

a spring, the spring having a first and second end, the spring's first end being positioned against the pivoting ball support, the spring's second end being positioned against the frame rear interior section interior surface, such that movement of the pivoting ball support face from its first position to its second position is resisted; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

5. An apparatus for receiving and securing a hitch ball, comprising:

a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening;

pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising:

the frame, the frame further having a slot;

the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

6. An apparatus for receiving and securing a hitch ball, comprising:

a frame, the frame having an interior, the frame interior having a front section and a rear section, the frame front interior section being shaped and sized for closely receiving portions of a generally round hitch ball, the frame further having a downwardly facing opening, the frame opening being shaped and positioned to allow hitch ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening;

pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising:

the frame, the frame further having a slot;

the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

7. A hitch, comprising:

a ball;

a frame, the frame having an interior, the frame interior having a front section and a rear section, the frame front interior section being shaped and sized for closely receiving portions of the hitch ball, the frame further having a downwardly facing opening, the frame opening being shaped and positioned to allow hitch ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the hitch ball positioned in the frame front interior section, the pivoting ball support further having a face, the pivoting ball support face being movable from a first position to a second position, the pivoting ball support face first position being such that the pivoting ball support face is at least partially beneath a portion of the hitch ball when the hitch ball is within the frame front interior section, the frame front interior section being sized and shaped such that the pivoting ball support face prevents the hitch ball from passing through the frame opening;

pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising:

the frame, the frame further having a slot;

the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

8. An apparatus for receiving and securing a ball, comprising:

a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section; a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening;

pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising:

the frame, the frame further having a slot;

the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

9. An apparatus for receiving and securing a ball, comprising:

a frame, the frame having an interior, the frame interior having a front section and a rear section, the frame front interior section being shaped and sized for closely receiving portions of a generally round ball, the frame further having an opening, the frame opening being shaped and positioned to allow ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening;

pivoting ball support movement prevention means, such that movement of the pivoting ball support face from the first position to the second position is prevented; and pivoting ball support forced rotation means, such that the pivoting ball support face can be manually moved from the first to the second position after disablement of the pivoting ball support movement prevention means, the pivoting ball support forced rotation means comprising:

the frame, the frame farther having a slot;

the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

10. A coupling device, comprising:

a ball;

a frame, the frame having an interior, the frame interior having a front section and a rear section, the frame front interior section being shaped and sized for closely receiving portions of the ball, the frame further having an opening, the frame opening being shaped and positioned to allow ball passage into the frame front interior section;

a pivoting ball support, the pivoting ball support having a pivot point, the pivoting ball support being attached to the frame at the pivoting ball support pivot point, the pivoting ball support pivot point being located within the frame rear interior section, the pivoting ball support's pivot motion being oriented for substantially perpendicular movement with respect to the ball positioned in the frame front interior section, the pivoting ball support further having a face, the pivoting ball support face being movable from a first position to a second position, the pivoting ball support face first position being such that the pivoting ball support face is at least partially beneath a portion of the ball when the ball is within the frame front interior section, the frame front interior section being sized and shaped such that the pivoting ball support face prevents the ball from passing through the frame opening;

pivoting ball support movement resistance means, such that movement of the pivoting ball support face from its first position to its second position is resisted; and pivoting ball support forced rotation means, such that the pivoting ball support face can be manually moved from the first to the second position, the pivoting ball support forced rotation means comprising:

the frame, the frame further having a slot;

the pivoting ball support, the pivoting ball support further having a top; and a handle, the handle being pivotally attached to the frame, the handle having a recess, the handle recess being shaped and positioned to closely receive the pivoting ball support top when the pivoting ball support is in the first position, the handle recess being further shaped and positioned such that, when the handle is pivoted, the handle moves the pivoting ball support from the first position to the second position.

* * * * *